United States Patent
Baskaran et al.

(10) Patent No.: US 9,043,856 B2
(45) Date of Patent: May 26, 2015

(54) REMOTE CONTROL OF PROGRAM RECEIVING DEVICES

(75) Inventors: Arjun Baskaran, Chennai (IN); Srirama R. Kalidindi, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 322 days.

(21) Appl. No.: 13/490,495

(22) Filed: Jun. 7, 2012

(65) Prior Publication Data

US 2013/0332979 A1  Dec. 12, 2013

(51) Int. Cl.
*H04N 7/173* (2011.01)
*H04N 21/422* (2011.01)

(52) U.S. Cl.
CPC ..... *H04N 21/42207* (2013.01); *H04N 21/4222* (2013.01)

(58) Field of Classification Search
None
See application file for complete search history.

(56) References Cited

U.S. PATENT DOCUMENTS

| 2009/0172757 A1* | 7/2009 | Aldrey et al. | 725/110 |
| 2009/0222874 A1* | 9/2009 | White et al. | 725/118 |
| 2011/0254683 A1* | 10/2011 | Soldan et al. | 340/539.13 |
| 2011/0304443 A1* | 12/2011 | Sheridan et al. | 340/12.5 |
| 2014/0165090 A1* | 6/2014 | Andreasen et al. | 725/25 |

* cited by examiner

*Primary Examiner* — Chenea Smith

(57) ABSTRACT

Methods, devices, and storage mediums provide for selecting a remote control mode of operation for a mobile device to allow the mobile device to remotely control a program receiving device. Additionally, methods, devices, and storage mediums provide for a proxy service to allow the mobile device to remotely control a program receiving device, an over-the-top service to allow the mobile device to remotely control a program receiving device, and a direct link service to allow the mobile device to remotely control a program receiving device. Methods, devices, and storage mediums also provide for a notification protocol.

20 Claims, 14 Drawing Sheets

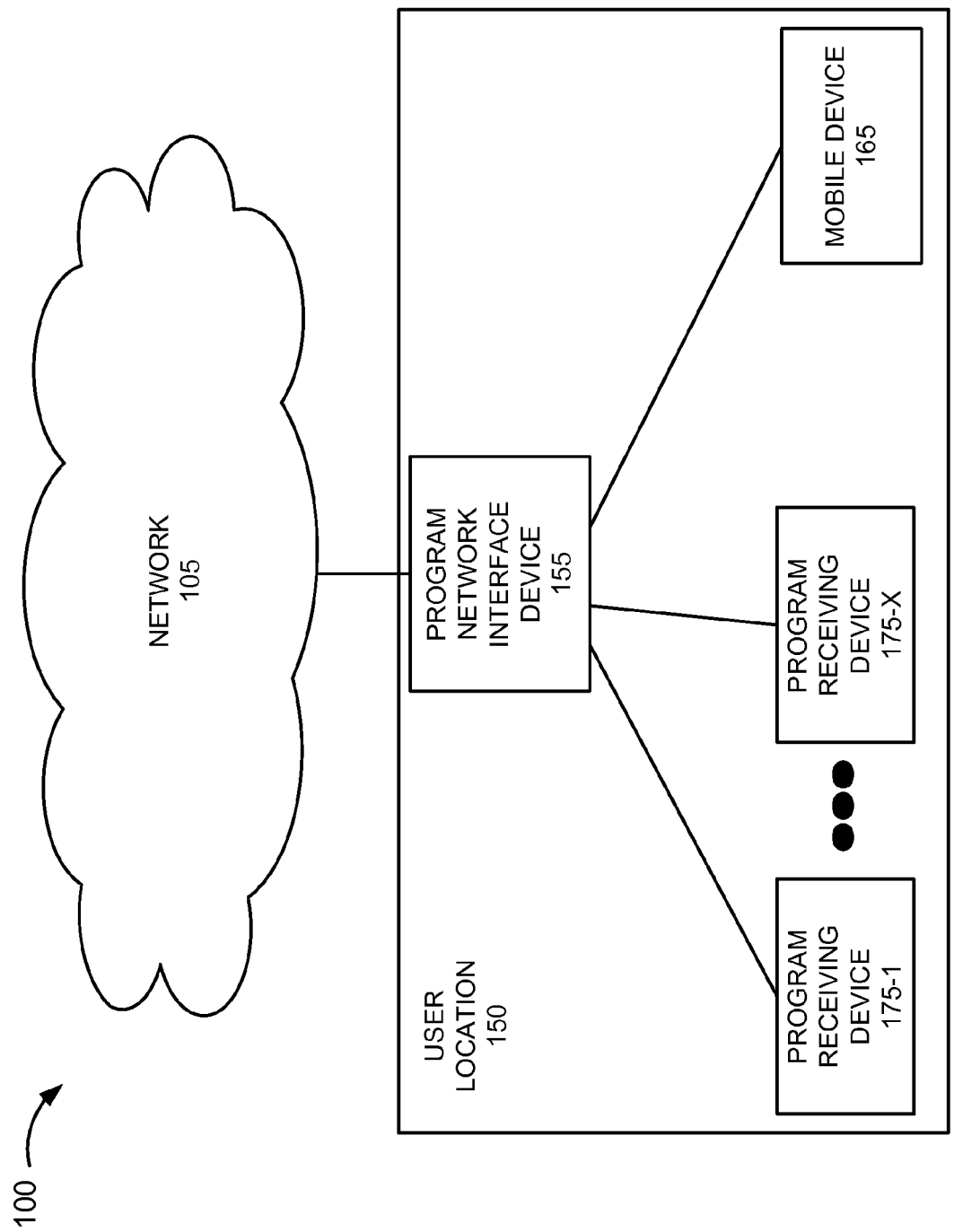

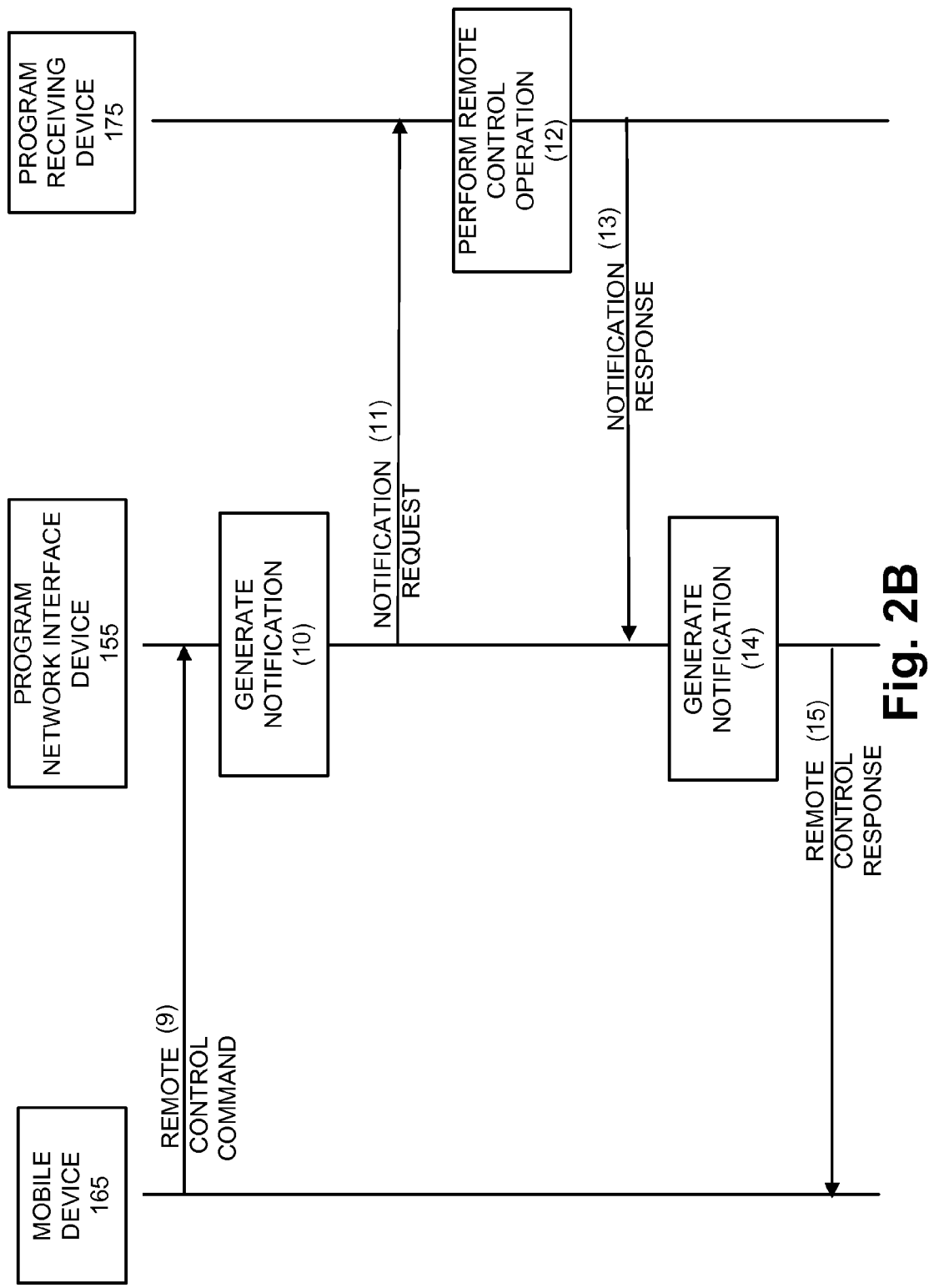

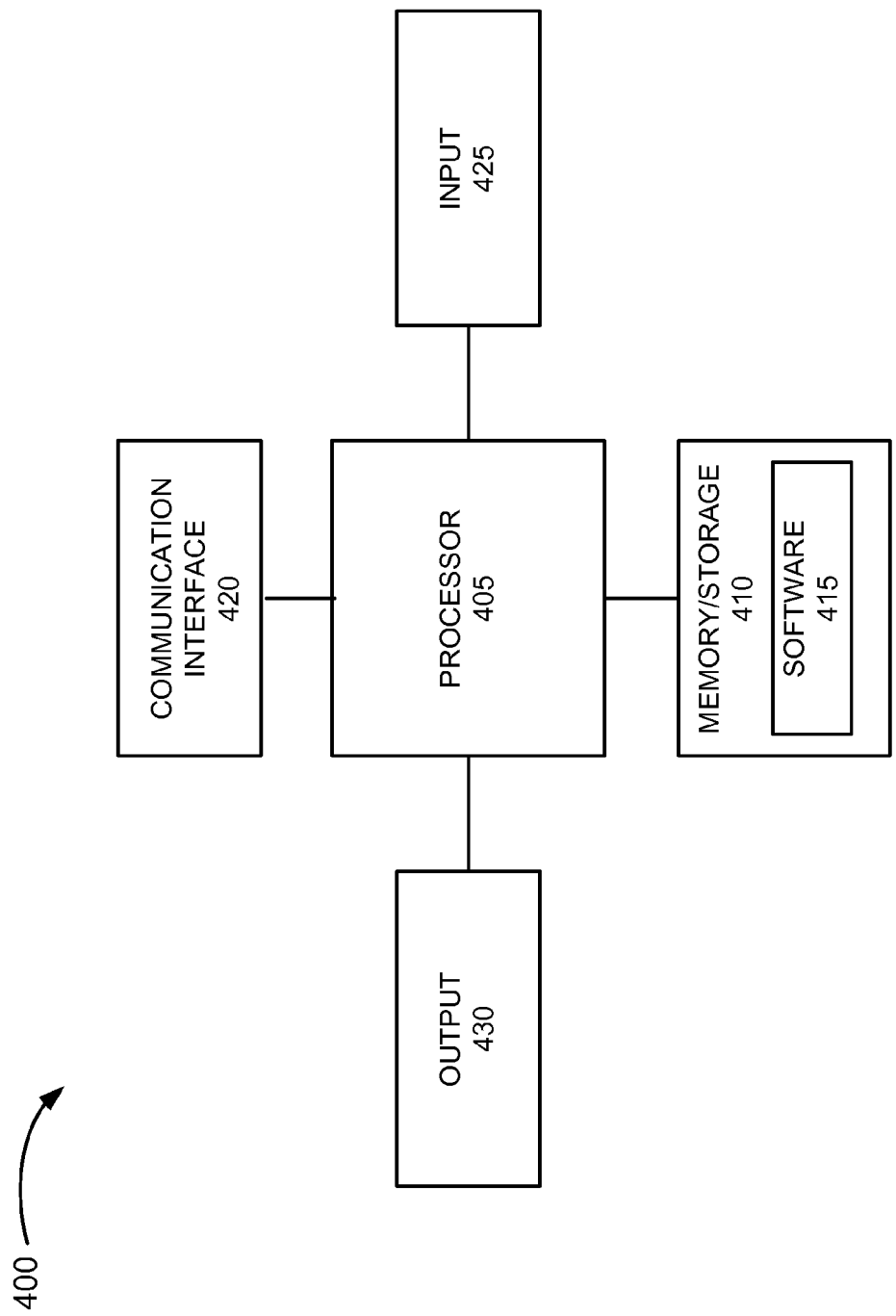

REMOTE CONTROL OF PROGRAM RECEIVING DEVICES

BACKGROUND

Program service providers, such as television service providers, offer customers an array of programs to view and provide other forms of content accessible via various graphical user interfaces. In a typical setting, a user views a program using a television, a set top box, and a remote control device. During a setup procedure, the remote control device is configured to control a particular television (e.g., by manufacturer). The remote control device allows the user to control the set top box, access various user interfaces, and control other peripheral devices, such as a DVD player, a Blu-ray player, an audio system, etc.

DESCRIPTION OF THE DRAWINGS

FIG. 1 is a diagram illustrating an exemplary environment in which an exemplary embodiment of remote control of a program receiving device may be implemented;

FIGS. 2A and 2B are messaging diagrams illustrating an exemplary process pertaining to remote control of a program receiving device using a proxy service;

FIG. 4 is a diagram illustrating exemplary components of a device that may correspond to one or more of the devices depicted in FIGS. 1-3;

DETAILED DESCRIPTION

Figure 2A:
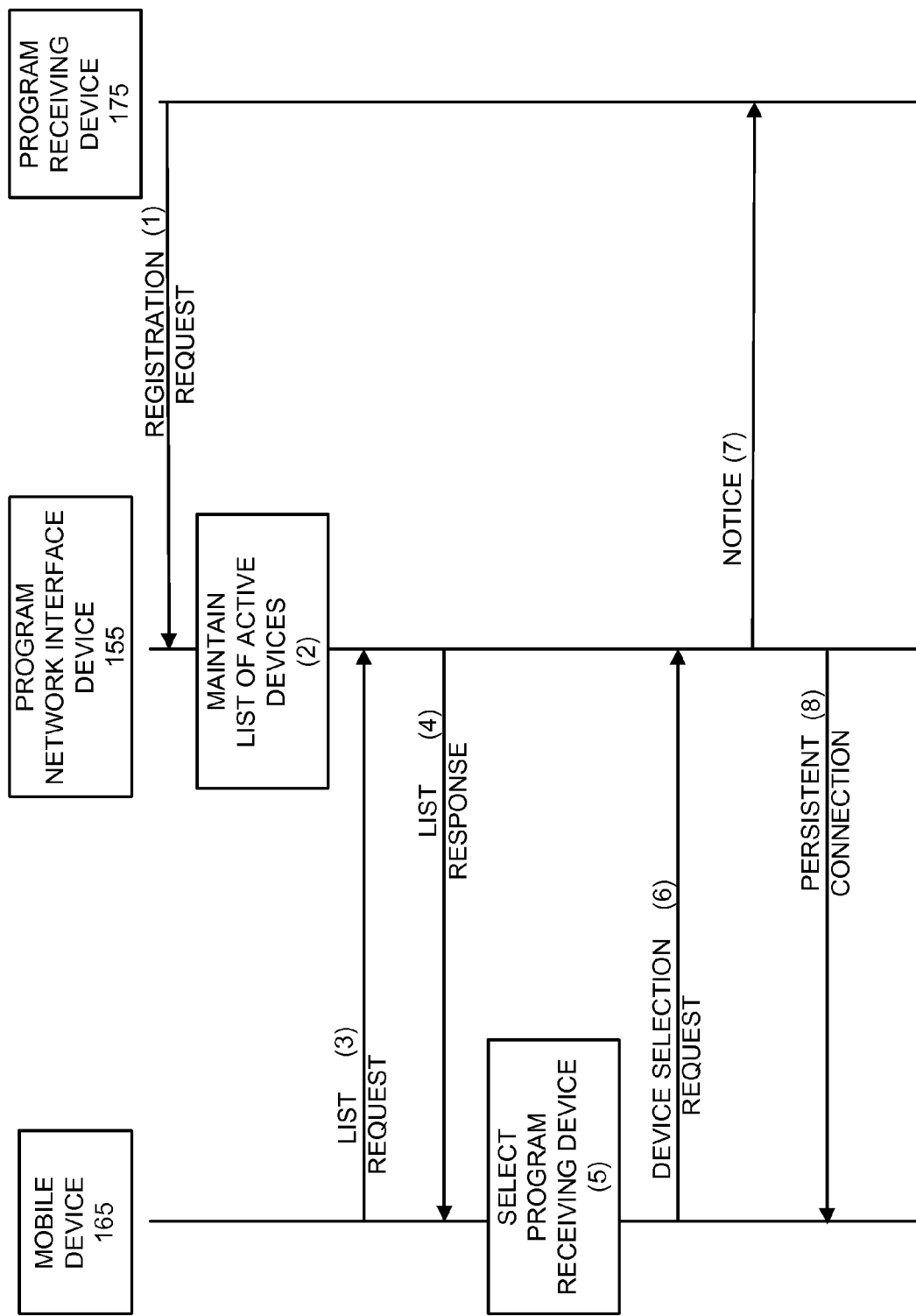

The following detailed description refers to the accompanying drawings. The same reference numbers in different drawings may identify the same or similar elements.

According to an exemplary embodiment, a program delivery system includes a mobile device, a program network interface device, and a program receiving device. The program delivery system may be implemented as a customer premises network (e.g., as an in-home program delivery system). According to an exemplary embodiment, the program delivery system allows a user, via the mobile device, to remotely control the program receiving device based on a communicative coupling with the program network interface device. Additionally, the user is able to control the program receiving device without limitations stemming from, for example, the manufacturer of the program receiving device, the type of program receiving device, etc.

The mobile device may be implemented as, for example, a smartphone, a tablet device, or similar type of user device, as described herein. According to an exemplary embodiment, the mobile device includes software (e.g., a mobile application) that provides user interfaces to allow a user to remotely control the program receiving device via the program network interface device. According to an exemplary embodiment, the software provides a user interface to allow the user to provide content (e.g., pictures, videos, etc.) stored on the mobile device, stored on a device tethered to the mobile device, or other device connected to the mobile device, to be displayed by the program receiving device. For example, the user may conduct a slideshow, via the mobile device, which is displayed on a television, or control the display of individual pictures (e.g., based on the user's gestures).

The program network interface device may be implemented as, for example, a computer, a media server device, or other types of devices, as described herein. According to an exemplary embodiment, the program network interface device includes software that provides a proxy service between the mobile device and the program receiving device to allow the mobile device to remotely control the program receiving device. According to an exemplary embodiment, the program network interface device establishes a persistent connection (e.g., over the Transmission Control Protocol (TCP)) with the mobile device that allows the user of the mobile device to issue remote control commands. According to an exemplary embodiment, the program network interface device communicates these remote control commands as notification messages, in accordance with a notification protocol. According to an exemplary implementation, the notification messages include request messages and response messages.

The program receiving device may be implemented as, for example, a set top box, a user device that has set top box capabilities (e.g., a smart television, etc.), or other types of user devices, as described herein. According to an exemplary embodiment, the program receiving device establishes a persistent connection (e.g., over TCP) with the program network interface device. According to an exemplary embodiment, the program receiving device includes software (e.g., an agent that includes a parser). The agent allows the program receiving device to interpret notifications messages and perform appropriate remote control responses.

According to an exemplary embodiment, a program delivery system includes a mobile device and a program receiving device. The program delivery system may be implemented as a customer premises network (e.g., as an in-home program delivery system). According to an exemplary embodiment, the program delivery system allows a user, via the mobile device, to remotely control the program receiving device. According to this embodiment, the mobile device communicates with the program receiving device without the program network interface device (e.g., the proxy service), as described herein.

According to an exemplary embodiment, a program delivery system includes a mobile device, a network interface device, a program receiving device, and an over-the-top (OTT) platform. According to an exemplary embodiment, the program delivery system allows a user, via the mobile device, to remotely control the program receiving device. According to this embodiment, the mobile device communicates with the program receiving device via the network interface device and the mobile device and the program receiving device registers with the OTT platform.

According to an exemplary embodiment, a program delivery device manages the mode in which the mobile device operates as such mode pertains to remotely controlling a program receiving device. For example, the program delivery device selects a proxy service mode, a direct communication mode, or the OTT mode in which the mobile device operates to remotely control the program receiving device. The program delivery device transmits information (e.g., configuration file) to the mobile device in accordance with the selected mode. The mobile device uses the information (e.g., during a boot-up process) and is thereafter capable of remotely controlling a program receiving device in correspondence to the selected mode of operation. The program delivery device may be implemented in a program delivery network.

While exemplary embodiments provided in this description may be implemented based on the use of a particular protocol, network architecture, platform, etc., such implementations are not intended to be restrictive or provide an exhaustive treatment, as such. In other words, the embodiments described herein may be implemented using other suitable protocols, network architectures, platforms, etc., which may not be specifically described.

FIG. 1 is a diagram illustrating an exemplary environment in which an exemplary embodiment of remote control of a program receiving device may be implemented. As illustrated, an environment 100 includes a network 105. Environment 100 also includes a user location. User location 150 includes a program network interface device 155, a mobile device 165, and program receiving devices 175-1 through 175-X, in which X>1 (also referred to collectively as program receiving devices 175 and individually as program receiving device 175).

The number of devices and networks, and the configuration in environment 100 are exemplary. According to other embodiments, environment 100 may include additional devices, fewer devices, different devices, and/or differently arranged devices, than those illustrated in FIG. 1. For example, environment 100 may include a wireless router to provide connectivity between the devices in user location 150. Additionally, or alternatively, environment 100 may include an additional network.

According to other embodiments, a single device in FIG. 1 may be implemented as multiple devices. For example, program network interface device 155 may be implemented as multiple devices or one or more of program receiving devices 175 may be implemented, respectively, as multiple devices. For example, program receiving device 175 may be implemented as multiple devices, such as, a set top box and a television, or a single device, such as a smart television. A device may be implemented according to one or multiple network architectures (e.g., a client device, a server device, a peer device, a proxy device, or a combination thereof).

Also, according to other embodiments, one or more functions and/or processes described as being performed by a particular device may be performed by a different device, or some combination of devices, which may or may not include the particular device.

Environment 100 may be implemented to include wired and/or wireless connections among the devices and network illustrated. A connection may be direct or indirect and may involve intermediary device(s) and/or network(s) not illustrated in FIG. 1. Additionally, the number and the arrangement of connections between the devices and the network are exemplary.

Network 105 includes a network that provides programs to users. For example, network 105 includes a program delivery network. For example, the program delivery network may provide a television service. Network 105 may also provide a mobile service and/or an Internet service. Network 105 may correspond to a satellite-based network and/or a terrestrial-based network. Network 105 may include a program streaming network, a program distribution network (e.g., a television delivery network), a mobile network, devices in the Internet, etc. Although not illustrated, network 105 may include, for example, billing devices, application servers, security devices, routing devices, program source devices, etc.

User location 150 is a location of a user(s). For example, user location 150 may be a residence, a place of business, etc. User location 150 may include other devices not specifically illustrated in FIG. 1, such as, a router device (e.g., an in-home router device, a broadband router, a wireless router, etc.), an optical network termination (ONT) device, etc.

Program network interface device 155 includes a device that interfaces with network 105, mobile device 165, and program receiving devices 175. For example, program network interface device 155 receives programs from network 105 and provides programs to program receiving devices 175. Program network interface device 155 may be implemented as, for example, a computational device (e.g., a computer), a server device (e.g., a media server device, etc.), a set top box, or other suitable device. The term "set top box" may include, for example, a converter box, a television receiver, a tuner device, a digibox device, an Internet Protocol (IP) set top box, an IPTV set top box, and/or some other type of device capable of performing processes described herein.

According to an exemplary embodiment, program network interface device 155 maintains information (e.g., a list) that identifies program receiving devices 175 that are connected to program network interface device 155 and are capable of being remotely controlled. Program network interface device 155 provides this information to mobile device 165.

According to an exemplary embodiment, program network interface device 155 provides a proxy service to allow mobile device 165 to remotely control program receiving device 175. According to an exemplary embodiment, program network interface device 155 establishes a persistent connection with mobile device 165 to receive remote control commands from mobile device 165. According to an exemplary embodiment, the remote control commands are in a binary protocol format. According to an exemplary embodiment, program network interface device 155 generates notification messages, in accordance with the notification protocol, based on the remote control commands. For example, program network interface device 155 translates remote control commands in the binary protocol format to a JavaScript Object Notation (JSON) format.

Program network interface device 155 transmits notification request messages to program receiving device 175 and receives notification response messages from program receiving device 175. Program network interface device 155 generates remote control responses based on the notification response messages and transmits the remote control responses to mobile device 165. For example, program network interface device 155 translates notification messages to remote control messages in the binary protocol format. Program network interface device 155 performs other process, as described herein.

Mobile device 165 includes a device capable of remotely controlling program receiving device 175. For example, mobile device 165 may be implemented as a smartphone, a tablet device, a netbook device, a personal digital assistant (PDA), a personal communication system (PCS), etc., or some other type of communicative device (e.g., a laptop computer, etc.).

According to an exemplary embodiment, mobile device 165 provides user interfaces to remotely control program receiving device 175. For example, the user interfaces may include graphical elements that represent keys included in a conventional remote control device for set top boxes, televisions, or other types of program receiving device 175. The user interfaces may include other types of interactive elements that provide remote control functionality. According to an exemplary embodiment, mobile device 165 includes a mobile application that provides for the remote control of program receiving devices 175, as described herein.

According to an exemplary embodiment, mobile device 165 remotely controls program receiving device 175 via program network interface device 155, instead of directly. According to an exemplary implementation, mobile device 165 generates and transmits remote control commands to program network interface device 155, according to a binary protocol. Mobile device 165 performs other processes as described herein.

Program receiving device 175 includes a device that is capable of displaying and/or causing to display programs provided via program network interface device 155. For example, program receiving device 175 may be implemented as a set top box, a smart television, a computer, a game console, a peripheral device, or an Internet Protocol (IP) client device. Program receiving device 175 may be associated with one of a variety of manufacturers. For example, program receiving device 175 may be a device that is not customer premises equipment provided by the program service provider.

According to an exemplary embodiment, program receiving device 175 includes an agent. The agent includes a parser and other modules to perform the processes described herein. The parser may be implemented as a JSON parser. According to an exemplary embodiment, program receiving device 175 (e.g., the agent) interprets notification messages and causes program receiving device 175 to perform remote control operations. Additionally, program receiving device 175 (e.g., the agent) generates and transmits notification messages to program network interface device 155, as well as performing other processes, as described herein.

FIGS. 2A and 2B are messaging diagrams illustrating an exemplary process performed by an exemplary embodiment of the program delivery system that includes a proxy service for remotely controlling program receiving devices. The exemplary process is described in relation to the devices illustrated in environment 100 of FIG. 1.

The messages and the data or information included therein are merely exemplary. According to other implementations, the program delivery system may use different types of messages and/or include different data or information. Additionally, or alternatively, although the exemplary process describes a particular device performing a step or an act of the process, the step or act may, alternatively be performed by another device, or some combination of devices.

Referring to FIG. 2A, in step (1), program receiving device 175 is powered on and performs a pairing process to register itself with program network interface device 155 to allow program receiving device 175 to receive programs from network 105 via program network interface device 155. For example, program receiving device 175 transmits a registration request that identifies program receiving device 175 (e.g., network address, name of device, etc.). Program receiving device 175 also establishes a persistent connection (e.g., over TCP) with program network interface device 155 as a result of the pairing process. For example, a secure User Datagram Protocol (UDP) persistent connection is established. According to an exemplary implementation, program receiving device 175 transmits a persistent connection request to program network interface device 155. However, in contrast to well-known techniques, program network interface device 155 does not transmit a response. Rather, program network interface device 155 waits to transmit a response when a notification message is to be transmitted to program receiving device 175 using the proxy service.

In step (2), after a successful pairing process, program network interface device 155 stores information indicating that program receiving device 175 is an active device capable of receiving programs and being remotely controlled. The information includes the network address and name of program receiving device 175. For example, according to this scenario, assume the name of program receiving device 175 is "living room set top box." Program network interface device 155 maintains an accounting of all active program receiving devices 175 (e.g., in a list, etc.).

In step (3), assume a user powers on mobile device 165 and the user wishes to remotely control the living room set top box. The user executes a mobile application, which causes mobile device 165 to transmit a list request. For example, mobile device 165 transmits a UDP broadcast within user location 150. In step (4), program network interface device 155 receives the list request broadcast. In response, program network interface device 155 retrieves the list information and transmits a list response to mobile device 165. The list response includes all active devices in user location 150, which includes program receiving device 175 (i.e., the living room set top box).

In step (5), mobile device 165 provides, via a user interface, a list of active devices in user location 150. For example, the user interface provides the names of all active devices in user location 150. The user selects, via the user interface, program receiving device 175 (i.e., the living room set top box). In step (6), mobile device 165 transmits a device selection request to program network interface device 155. The device selection request indicates that the user wishes to remotely control program receiving device 175. The device selection request is transmitted using, for example, a binary protocol.

In step (7), in response to receiving the device selection request, program network interface device 155 generates a notice (e.g., a wakeup message) to give notice to program receiving device 175 that mobile device 165 intends to remotely control program receiving device 175. As illustrated, program network interface device 155 transmits the notice to program receiving device 175. In step (8), program network interface device 155 establishes a persistent connection with mobile device 165.

Referring to FIG. 2B, the user selects, via the user interface of mobile device 165, a remote control command. In step (9), mobile device 165 generates and transmits the remote control command via the persistent connection using the binary protocol. In step (10), in response to receiving the remote control command, program network interface device 155 interprets the remote control command and generates a corresponding notification message of the notification protocol. The messages of the notification protocol are described further below. For example, program network interface device 155 translates the remote control command of the binary protocol to a JSON format that is incorporated into a notification message of the notification protocol, which is described further below. According to an exemplary implementation, program network interface device 155 uses mapping to correlate the remote control command to a notification message and, in turn, generate the notification message.

In step (11), program network interface device 155 transmits a notification request to program receiving device 175. In step (12), the parser of program receiving device 175 parses and the agent interprets the notification request. According to this example, assume that no error occurs and program receiving device 175 performs a remote control operation. For example, a notification message (e.g., a remote keys request message) provides for a general remote command, such as menu, guide, video-on-demand, channel selection, etc.

In step (13), program receiving device 175 generates and transmits a notification response to program network interface device 155. In step (14), in response to receiving the notification response from program receiving device 175, program network interface device 155 interprets the notification message and generates a corresponding remote control response. For example, program network interface device 155 uses mapping to correlate the notification message to a remote control response message. In step (15), program network interface device 155 transmits the remote control response to mobile device 165.

While FIGS. 2A and 2B are messaging diagrams pertaining to an exemplary process performed by an exemplary embodiment of a program delivery system, according to other scenarios, the message(s) transmitted and/or received may be different, and/or the step(s) or act(s) described may be different.

Figure 3:
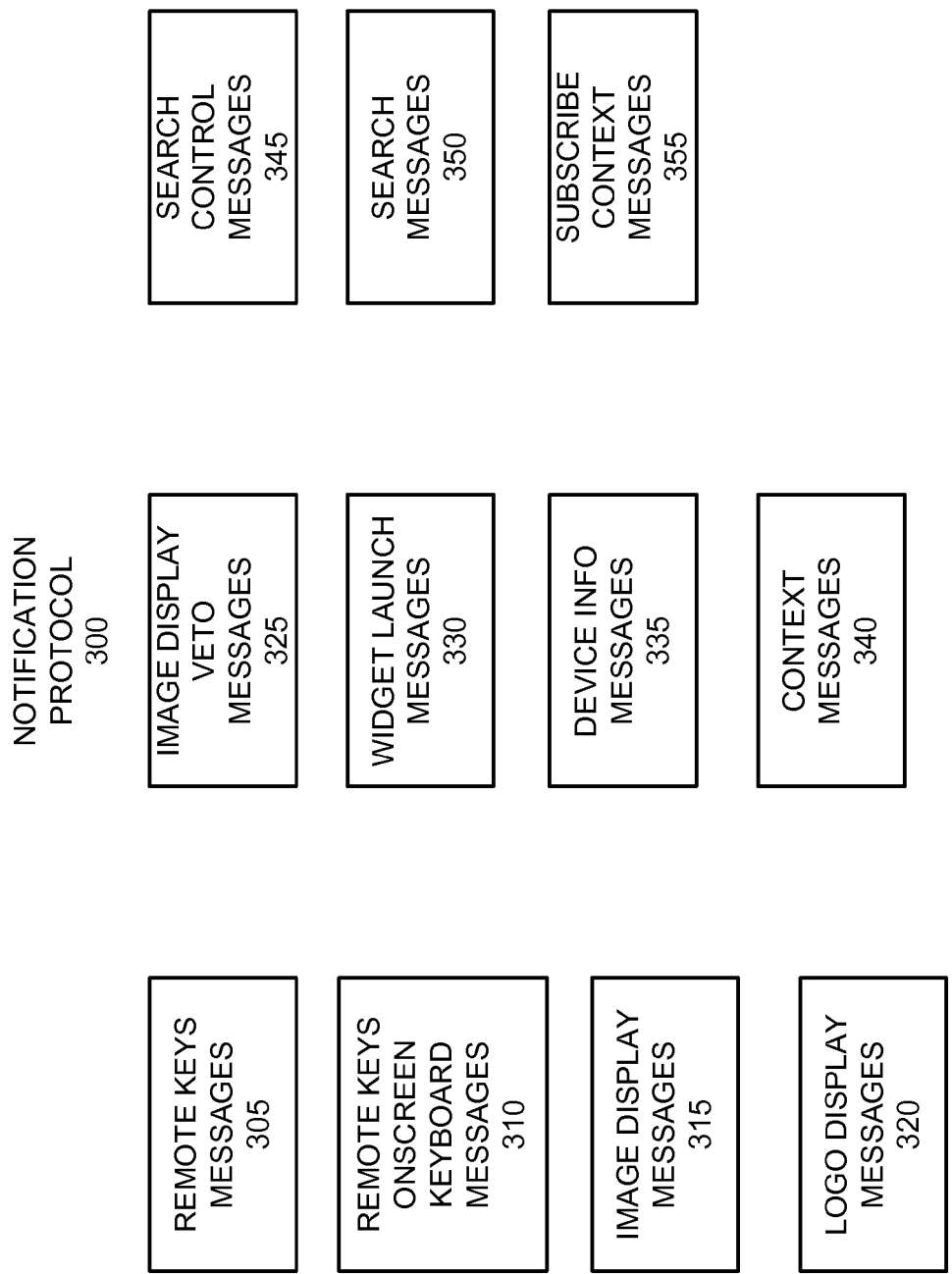
FIG. 3 is a diagram illustrating exemplary messages pertaining to remote control of a program receiving device.

FIG. 3 is a diagram illustrating commands associated with an exemplary embodiment of the notification protocol 300. As illustrated notification protocol 300 includes messages 305 through 355, as described further below. According to an exemplary implementation, each message includes a request message, which is generated by and transmitted from program network interface device 155 to program receiving device 175, and a response message, which is generated by and transmitted from program receiving device 175 to program network interface device 155.

Remote keys messages 305 include remote control commands, such as, for example, channel selection, volume control, menu, video-on-demand, guide, information, cursor, enter, a numeric entry, an alphabetic entry, etc.

```
Request: {                         Response: {
    SessionID: Integer                 SessionID: integer
    CommandID: Integer                 CommandID: Integer
    CommandValue: Integer              CommandStatus: Integer
}                                      ErrMsg: String
                                   }
```

Referring to remote keys messages 305, the SessionID field is an integer value that identifies program receiving device 175; the CommandID field is an integer value that identifies the remote key command; the CommandValue field is an integer value that represents a remote key code that may be interpreted by program receiving device 175 as, for example, a key code; the CommandStatus field is an integer that indicates a success or a failure of the command; and the ErrMsg field is a string that indicates an error, such as, a type of error. When the command is successfully carried out (e.g., indicated in CommandStatus field), ErrMsg field may indicate, for example, "none" or something similar. Fields described for remote keys messages 305 are also used in the messages described further below, and therefore their description is omitted to avoid redundancy. Additionally, each message will have a unique value for the CommandValue field to uniquely identify a message.

Remote keys onscreen keyboard messages 310 include a remote control command that helps the user key in strings or lone data on mobile device 165

```
Request: {                         Response: {
    SessionID: Integer                 SessionID: integer
    CommandID: Integer                 CommandID: Integer
    CommandValue: Integer              CommandStatus: Integer
    CommandValueExtra: String          ErrMsg: String
}                                  }
```

Referring to remote keys onscreen messages 310, the CommandValueExtra field may indicate one of multiple values. The CommandValue field indicates an ASCII letter (e.g., a-z, A-Z), a number (e.g., 0-9), a symbol (e.g., @, #, etc.) or a space. If CommandValue field indicates a value of 1, then go to the beginning of the textbox or home and CommandValueExtra field will indicate an empty string; if CommandValue field indicates a value of 2, then go to the end of the textbox and CommandValueExtra field will indicate an empty string; if CommandValue field indicates a value of 3, then append ".com" in the textbox and CommandValueExtra field will indicate an empty string; if CommandValue field indicates a value of 4, then append ".net" in the textbox and CommandValueExtra field will indicate an empty string; if CommandValue field indicates a value of 8, then perform a backspace and CommandValueExtra field will indicate an empty string; if CommandValue field indicates a value of 13, then interpret as an OK or a Return (e.g., an Enter) and CommandValueExtra field will indicate an empty string; if CommandValue field indicates a value of 5, then clear the textbox and CommandValueExtra field will indicate an empty string; if CommandValue field indicates a value of 15, expect CommandValueExtra field to indicate a string to be appended in the textbox; and any other value included in CommandValue field should be an ASCII value and appended as a character in the textbox.

Image display messages 315 include a remote control message that allows the user to send picture(s) stored on or accessible by mobile device 165 to program network interface device 155. The location of the picture(s) would be identified as, for example, a URL. The picture(s) may be displayed on program receiving device 175 individually (e.g., photo-flicking), as a slideshow, etc.

```
Request: {                         Response: {
    SessionID: Integer                 SessionID: integer
    CommandID: Integer                 CommandID: Integer
    URL: String                        CommandStatus: Integer
}                                      ErrMsg: String
                                   }
```

Referring to image display messages 315, the URL field indicates a URL for an image, which is obtained by program receiving device 175 and displayed. According to an exemplary implementation, that image appears onscreen for a predetermined time period (e.g., 15 seconds) or in sync with any remote key event, whichever comes earlier.

Logo display messages 320 include a remote control command that causes a logo image to be displayed on program receiving device 175 to indicate that a set top box is being selected.

```
Request: {                      Response: {
    SessionID: Integer              SessionID: integer
    CommandID: Integer              CommandID: Integer
    TimeToDisplay: Integer          CommandStatus: Integer
    URL: String                     ErrMsg: String
}                               }
```

Referring to logo display messages 320, the TimeToDisplay field indicates a time (e.g., in seconds) to show an image (e.g., a logo) in a particular location, onscreen. The URL field indicates a local URL of the image stored by program network interface device 155.

Image display veto messages 325 include a remote control command to determine if an image disappears.

```
Request: {                      Response: {
    SessionID: Integer              SessionID: integer
    CommandID: Integer              CommandID: Integer
    CommandValue: Integer           CommandStatus: Integer
}                                   ErrMsg: String
                                }
```

Referring to image display veto messages 325, the CommandValue field will be one of two values. A value of 1 indicates that the image displayed resulting from image display messages 315 should be displayed indefinitely until any remote or key event occurs. A value of 2 immediately cancels the onscreen image and goes back to channel feed. These messages may be used to obtain a fine-grained control of how long the image should be displayed from logo display messages 320. The default image timeout period takes a lower precedence when the request of image display veto messages 325 is received and CommandValue field has a value of 1 (to display indefinitely) or 2 (cancel display immediately).

Widget launch messages 330 include a remote control command to launch a widget (e.g., a television widget, etc.) without a user having to launch the widget via navigation through a menu system. For example, widget launch messages 330 may provide a shortcut to cause a widget to execute.

```
Request: {                      Response: {
    SessionID: Integer              SessionID: integer
    CommandID: Integer              CommandID: Integer
    WidgetID: Integer               CommandStatus: Integer
    Params: [{key1:value1},         ErrMsg: String
    key2:value2}]               }
}
```

Referring to widget launch messages 330, WidgetID field indicates an identifier of a widget; Params field includes an array of key value pairs. The default array will be a two element array to receive credentials. For example, a widget pertaining to Facebook™ can have two keyvalue pairs; one keyvalue pair for the user identifier, and the other keyvalue pair for the password. Other types of parameters may be used depending on the widget and configuration. A widget with credentials may be launched directly, without the prompting of a credential screen.

Device info messages 335 include a remote control command that is used during an initial handshake communication that assists to establish a communication between program receiving device 175 and program network interface device 155, and in turn cascades to mobile device 165.

```
Request: {                      Response: {
    SessionID: Integer              SessionID: integer
    CommandID: Integer              CommandID: Integer
}                                   Response: [{key:value},
                                    {key:value}]
                                    CommandStatus: Integer
                                    Errmsg: String
                                }
```

Referring to device info messages 335, the Response will include an array of device information, such as the network address of program receiving device 175 and name of program receiving device 175 (e.g., a registered name stored by program network interface 155). As previously described, device info messages 335 are exchanged when the user of mobile device 165 initiates a request to obtain a list of program receiving devices 175 that are connected to program network interface device 155 and are able to be remotely controlled.

Context request messages 340 include a remote control command that provides information to mobile device 165 as to a type of program that program receiving device 175 is playing. For example, whether program receiving device 175 is playing a video-on-demand program, a digital video recorded program, live television, etc.

```
Request: {                      Response: {
    SessionID: Integer              SessionID: integer
    CommandID: Integer              CommandID: Integer
}                                   NoOfWidgets: Integer
                                    Widgetinfo:
                                    [
                                        {
                                        Wname: String
                                        WidgetID: Integer
                                        Category: String
                                        }
                                    ]
                                    VODDetails:
                                    {
                                    VODActive: String
                                    VODStreamTickOpt: String
                                    Title: String
                                    Desc: String
                                    Rating: String
                                    RunningTime: String
                                    Genre: String
                                    }
                                    DVRInfo:
                                    {
                                    DVRActive: String
                                    Title: String
                                    Desc: String
                                    Rating: String
                                    RunningTime: String
                                    Genre: String
                                    RecordingTime: String
                                    }
                                    ChannelName:
                                    {
                                    Name: String
                                    Number: Integer
                                    Rating: String
                                    Desc: String
                                    Volume: Integer
                                    }
                                    CommandStatus: Integer
                                    ErrMsg: String
                                }
```

Referring to context request messages 340, NoOfWidgets field indicates the number of currently active widgets; WidgetInfo field indicates information pertaining to the widget, such as widget name, widget identifier, and a widget category (e.g., my widgets, games, weather, etc.); VODDetails field indicates whether any video-on-demand (VOD) is active and other VOD information, such as title, description, rating, running time, and genre; DVRInfo field indicates whether any DVR is active and DVR information, such as title, description, rating, running time, genre, and recording time; ChannelName field indicates the name of the channel and other channel information, such as, number, rating, description, and volume.

Search control messages 345 include a remote control command that controls the launch of a search request from different contexts of program receiving device 175.

```
Request: {                        Response: {
    SessionID: Integer                SessionID: integer
    CommandID: Integer                CommandID: Integer
    CommandValue: Integer             CommandStatus: Integer
}                                     ErrMsg: String
                                  }
```

Referring to search control messages 345, the CommandValue field will indicate one of two values. If the value is a 1, a search for a widget should be launched. If the value is a 2, the search should be terminated.

Search messages 350 include a remote control command that launches a search widget interactive interface from a different context based on the string that the user would like to search.

```
Request: {                        Response: {
    SessionID: Integer                SessionID: integer
    CommandID: Integer                CommandID: Integer
    CommandValueExtra: String         CommandStatus: Integer
}                                     ErrMsg: String
                                  }
```

Referring to search messages 350, the CommandValue field will indicate one of two values. If the value is a 1, CommandValueExtra field will include the search string (e.g., the name of a movie) to search. If the value is a 2, CommandValueExtra field will include a string that is to be appended in the search keypad.

Subscriber context messages 355 include a remote control command that provides an auto-subscription to the changes in the context of the modes that program receiving device 175 may undergo. In this way, there is an automatic notification to mobile device 165 versus, for example, a pull mechanism.

```
Request: {                        Response: {
    SessionID: Integer                SessionID: integer
    CommandID: Integer                CommandID: Integer
    CommandValue: Integer             CommandStatus: Integer
}                                     ErrMsg: String
                                  }
```

Referring to subscriber context messages 355, the CommandValue field will indicate one of two values. If the value is a 1, a subscription to an event is to be registered, which will notify mobile device 165 regarding events pertaining to program receiving device 175, such as a power-on event, a power-off event, a channel change event, a DVR delete event, a DVR start recording event, a DVR stop recording event, a parental pin set event, etc. If the value is a 0, the subscription is cancelled.

In addition to the remote control commands included in the notification messages of the notification protocol, mobile device 165 may import favorites from program receiving device 175 (e.g., set top box and television), and vice versa, as well as synching the favorites with network 105 (e.g., a program delivery system). Mobile device 165 may also allow a user to control DVR schedules and setup parental controls.

FIG. 4 is a diagram illustrating exemplary components of a device 400 that may correspond to one or more of the devices depicted in the previous figures. As illustrated, according to an exemplary embodiment, device 400 includes a processor 405, memory/storage 410, software 415, a communication interface 420, an input 425, and an output 430. According to other embodiments, device 400 may include fewer components, additional components, different components, and/or a different arrangement of components than those illustrated in FIG. 4 and described herein.

Processor 405 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 may include one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 may include an application or a program that provides a function and/or a process. Software 415 may include firmware. For example, mobile device 165 may be implemented with one or more program(s) and/or application(s). Additionally, for example, one or more program(s) and/or application(s) may be used to display user interfaces, communicate with program network interface device 155, etc. Additionally, for example, other devices may be implemented with software 415 to provide a function and/or a process described herein.

Communication interface 420 may permit device 400 to communicate with other devices, networks, systems, etc. Communication interface 420 may include one or multiple wireless interfaces and/or wired interfaces. Communication interface 420 may include one or multiple transmitters, receivers, and/or transceivers. Communication interface 420 may operate according to one or multiple protocols, standards, and/or the like.

Input 425 may permit an input into device 400. For example, input 425 may include a keyboard, a keypad, a mouse, a display, a touchscreen, a touchless screen, a button, a switch, an input port, speech recognition logic, and/or some other type of visual, auditory, tactile, etc., input component. Output 430 may permit an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.), the execution of firmware with hardware, or the execution of software and firmware with hardware.

According to an exemplary embodiment, program network interface device 155 receives programs from a network device (e.g., a media server, a central office, etc., not illustrated in FIG. 1) associated with network 105. Program network interface device 155 may comprise tuners that permit program network interface device 155 to tune to particular programs or television channels requested by a user. As an example, program network interface device 155 may provide a tuned program to a user via a set top box and a television.

Figure 5A:
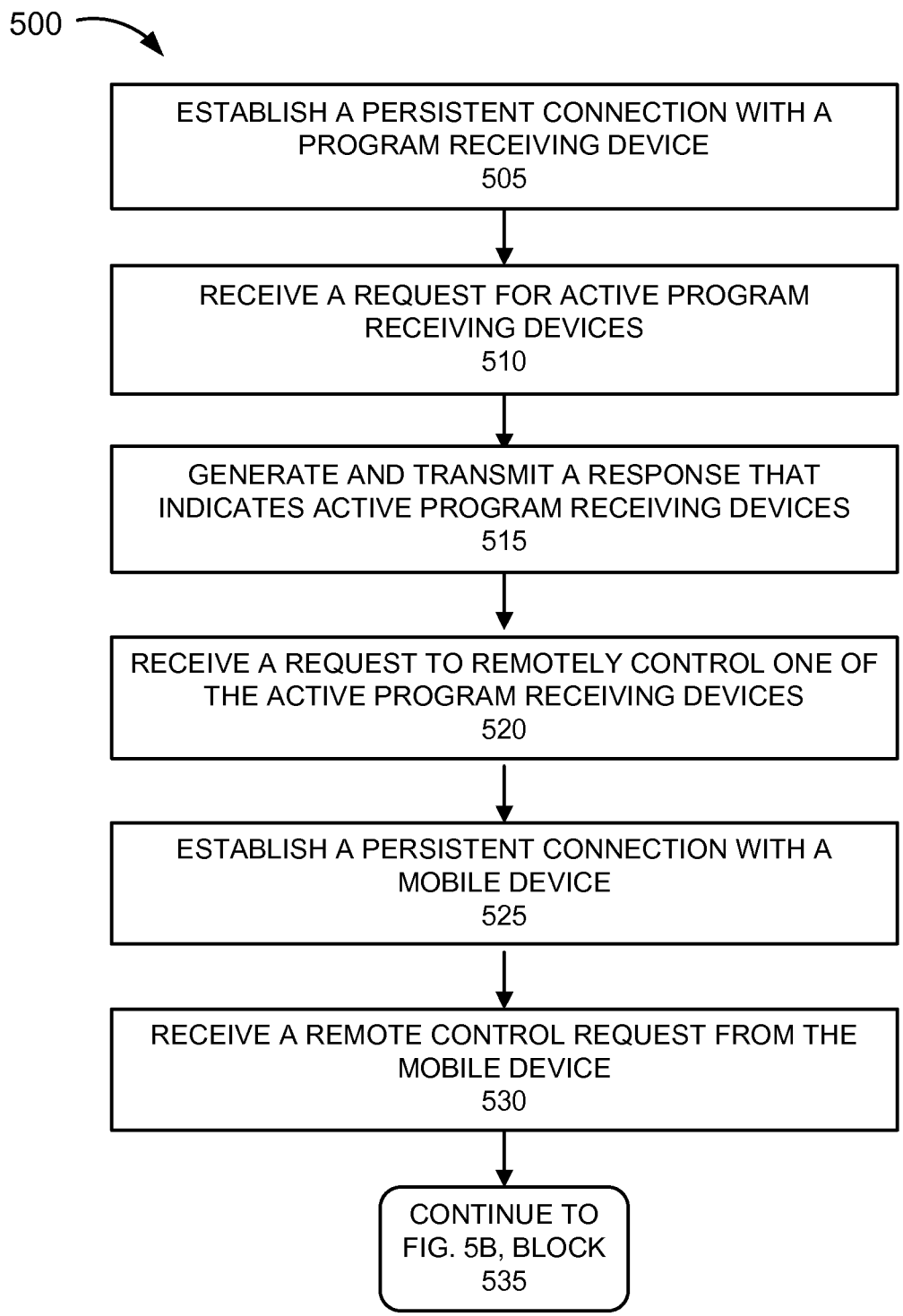
FIGS. 5A and 5B are flow diagrams illustrating an exemplary process for remotely controlling a program receiving device using a proxy service.
Figure 5B:
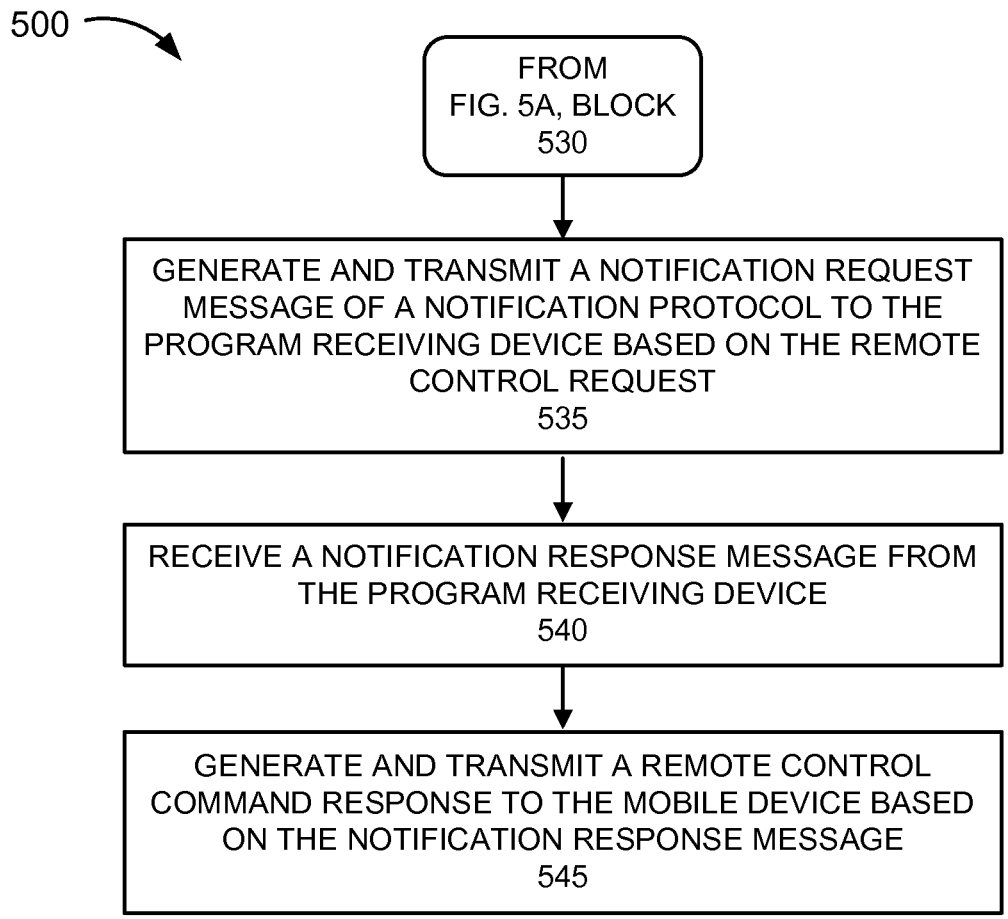

FIGS. 5A and 5B are flow diagrams illustrating an exemplary process 500 for remotely controlling a program receiving device using a proxy service. A step described in process 500 is performed by one of the devices illustrated in FIG. 1. For example, process 500 may be performed by program network interface device 155 in which processor 405 executes software 415 to perform the steps described.

Process 500 begins with establishing a persistent connection with a program receiving device (block 505). For example, during a pairing process, program receiving device 175 transmits a registration request to program network interface device 155, as previously described. Upon receipt, program network interface device 155 stores device profile information, such as network address(es) (e.g., IP, MAC) and name of device (e.g., default name, user-assigned name). As previously described, program network interface device 155 keeps track of all active (e.g., powered-on and paired) program receiving devices 175. For example, program network interface device 155 may generate a list or other data structure that indicates the active program receiving devices 175. Program network interface device 155 establishes a persistent connection with program receiving device 175.

In block 510, a request for active program receiving devices is received. For example, program network interface device 155 receives a broadcasted request message, transmitted by mobile device 165, for all active program receiving devices 175. For example, the broadcasted request message is implemented as a device info request message 335.

In block 515, a response that indicates the active program receiving devices is generated and transmitted. For example, in response to the broadcast request message, program network interface device 155 generates and transmits a response, which indicates each of the active program receiving devices 175, to mobile device 165. For example, the response is implemented as a device info message 335.

In block 520, a request to remotely control one of the active program receiving devices is received. For example, program network interface device 155 receives a request, which indicates a user's selection of a program receiving device 175 to remotely control, from mobile device 165. For example, the request includes device profile information pertaining to the selected program receiving device 175.

In block 525, a persistent connection with a mobile device is established. For example, in response to receiving the request, program network interface device 155 establishes a persistent connection with mobile device 165. Additionally, for example, program network interface device 155 may generate and transmit a wakeup message to the selected program receiving device 175. Program network interface device 155 may transmit a logo display request message 320 to program receiving device 175. The logo display response message 320 is received by program network interface device 155 and a corresponding remote control command response message is generated and transmitted to mobile device 165. The remote control command response message may cause mobile device 165 to indicate to the user (e.g., via a user interface) that mobile device 165 and program receiving device 175 are connected for remote control.

In block 530, a remote control request from the mobile device is received. For example, program network interface device 155 receives a remote control command from mobile device 165.

Referring to FIG. 5B, in block 535, a notification request message of a notification protocol is generated and transmitted to the program receiving device based on the remote control request. For example, program network interface device 155 generates the appropriate notification request message based on the remote control request. Program network interface device 155 transmits the notification message to program receiving device 175.

In block 540, a notification response message from the program receiving device is received. For example, program network interface device 155 receives a notification response message from program receiving device 175.

In block 545, a remote control command response is generated and transmitted to the mobile device based on the notification response message. For example, program network interface device 155 generates the appropriate remote control command response based on the notification response message. Program network interface device 155 transmits the remote control command response to mobile device 165. Process 500 may continue in which blocks 530 through 545 are repeated in accordance with the user's remote control request(s) and the proxy service provided by program network interface device 155.

Although FIGS. 5A and 5B illustrates an exemplary process 500 for remotely controlling a program receiving device using a proxy service, process 500 may include additional operations, fewer operations, and/or different operations than those illustrated in FIGS. 5A and 5B and described herein.

Figure 6:
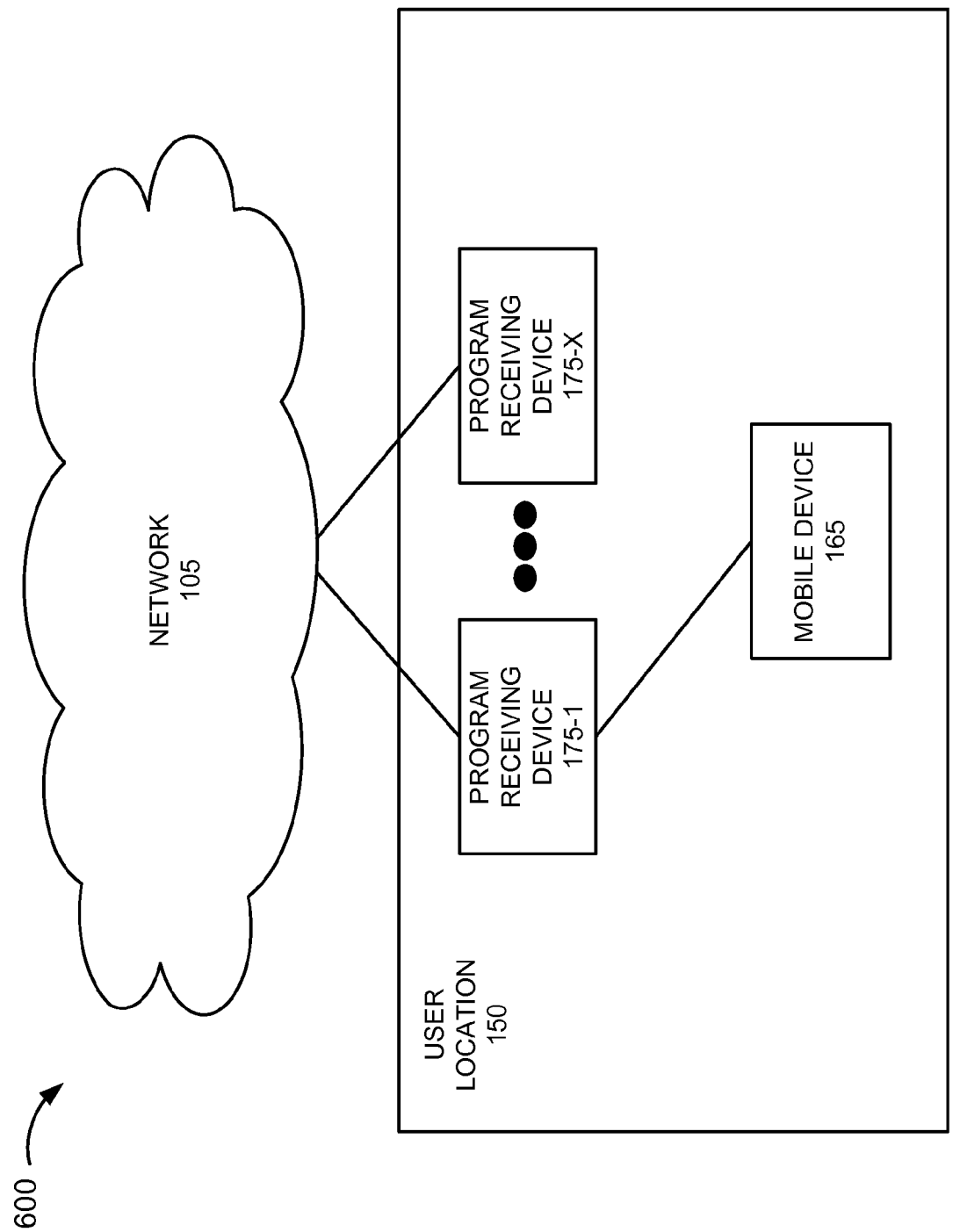
FIG. 6 is a diagram illustrating another exemplary environment in which an exemplary embodiment of remote control of a program receiving device may be implemented.

FIG. 6 is a diagram illustrating another exemplary environment in which an exemplary embodiment of remote control of a program receiving device may be implemented. As illustrated, an environment 600 includes network 105. Environment 600 also includes user location 150 that includes mobile device 165 and program receiving devices 175. The devices in environment 600 have been previously described. However, in contrast to environment 100, mobile device 165 may remotely control program receiving device 175 without the proxy service provided by program network interface device 155. Additionally, unlike program receiving device 175 of environment 100, program receiving device 175 of environment 600 is able to perform socket operations (e.g., reading, writing, connecting, disconnecting, closing, listening, etc). For example, the socket operations may be performed on a TCP/IP socket.

The number of devices and networks, and the configuration in environment 600 are exemplary. According to other embodiments, environment 600 may include additional devices, different devices, and/or differently arranged devices, than those illustrated in FIG. 6. For example, environment 600 includes a wireless router to provide connectivity between the devices in user location 150. Additionally, or alternatively, environment 600 may include an additional network.

Environment 600 may be implemented to include wired and/or wireless connections among the devices and network illustrated. A connection may be direct or indirect and may involve intermediary device(s) and/or network(s) not illustrated in FIG. 6. Additionally, the number and the arrangement of connections between the devices and the network are exemplary.

Figure 7:
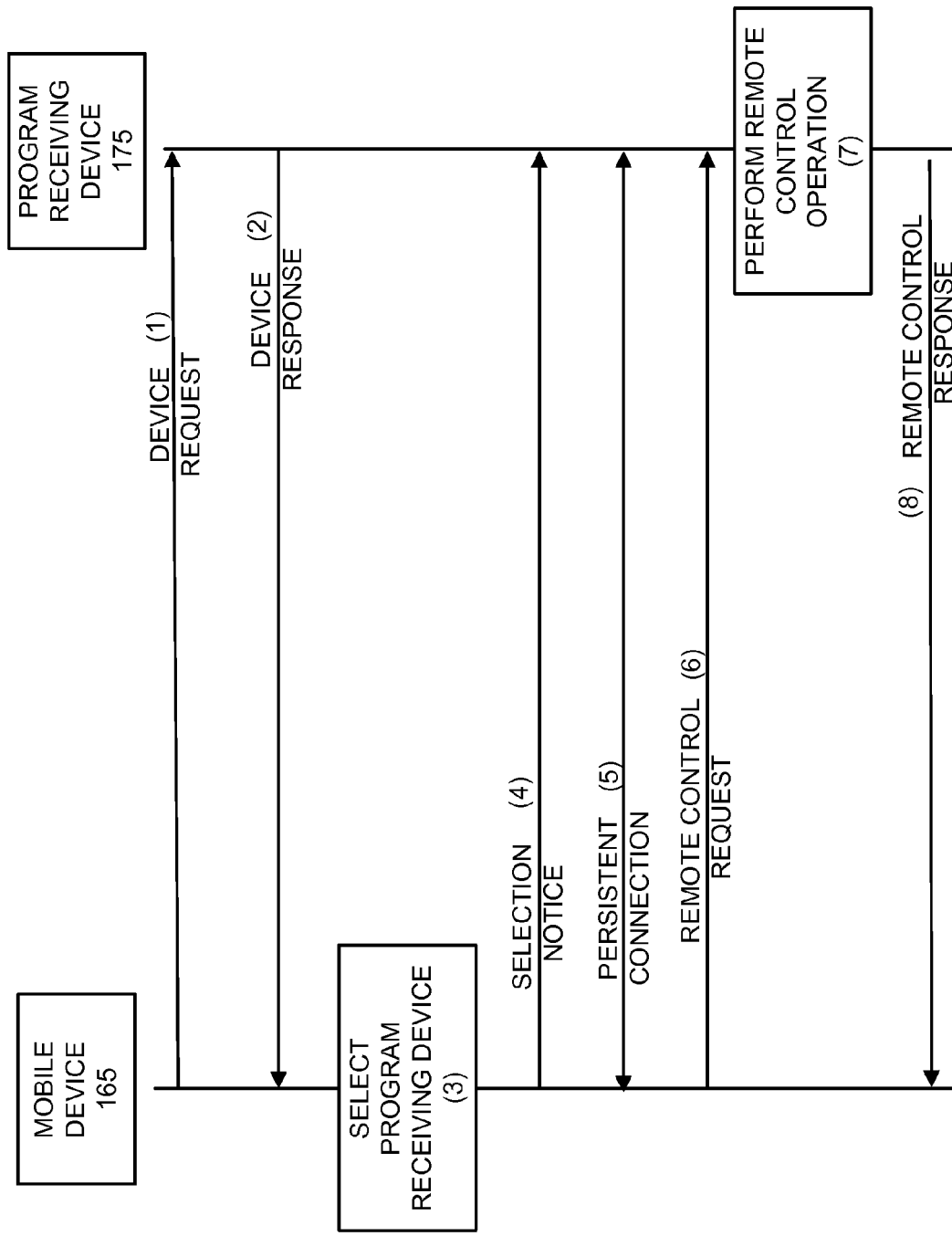
FIG. 7 is a messaging diagram illustrating an exemplary process pertaining to remote control of a program receiving device without using a proxy service.

FIG. 7 is a messaging diagram illustrating an exemplary process performed by an exemplary embodiment of the program delivery system in which a proxy service for remotely controlling program receiving devices is not used. The exemplary process is described in relation to the devices illustrated in environment 600 of FIG. 6.

The messages and the data or information included therein are merely exemplary. According to other implementations, the program delivery system may use different types of messages and/or include different data or information. Additionally, or alternatively, although the exemplary process describes a particular device performing a step or an act of the process, the step or act may, alternatively be performed by another device, or some combination of devices.

As illustrated in FIG. 7, in step (1), mobile device 165 transmits a device request to program receiving devices 175. For example, mobile device 165 may broadcast the device request to allow any active program receiving device 175 to respond. For example, the device request is implemented as the device info request message 335.

In step (2) mobile device 165 receives a device response from active program receiving devices 175. For example, each program receiving device 175 may transmit a device response. For example, the device response is implemented as the device info response message 335.

In step (3), mobile device 165 may indicate to a user which program receiving devices 175 are available. In response, the user selects which program receiving device 175 to remotely control.

In step (4), mobile device 165 generates and transmits a selection notice to program receiving device 175. The selection notice indicates to program receiving device 175 that mobile device 165 is to remotely control program receiving device 175.

In step (5) mobile device 165 or program receiving device 175 establishes a persistent connection. Mobile device 165 may also transmit a logo display request message 320 to program receiving device 175. Program receiving device 175 may transmit a logo display response message 320, which when received by mobile device 165, may cause mobile device 165 to indicate that mobile device 165 and program receiving device 175 are connected for remote control.

In steps (6)-(8), mobile device 165 transmits remote control commands, program receiving device 175 performs a remote control operation, and in response transmits a remote control response using the remote control messages of the notification protocol described herein.

Figure 8:
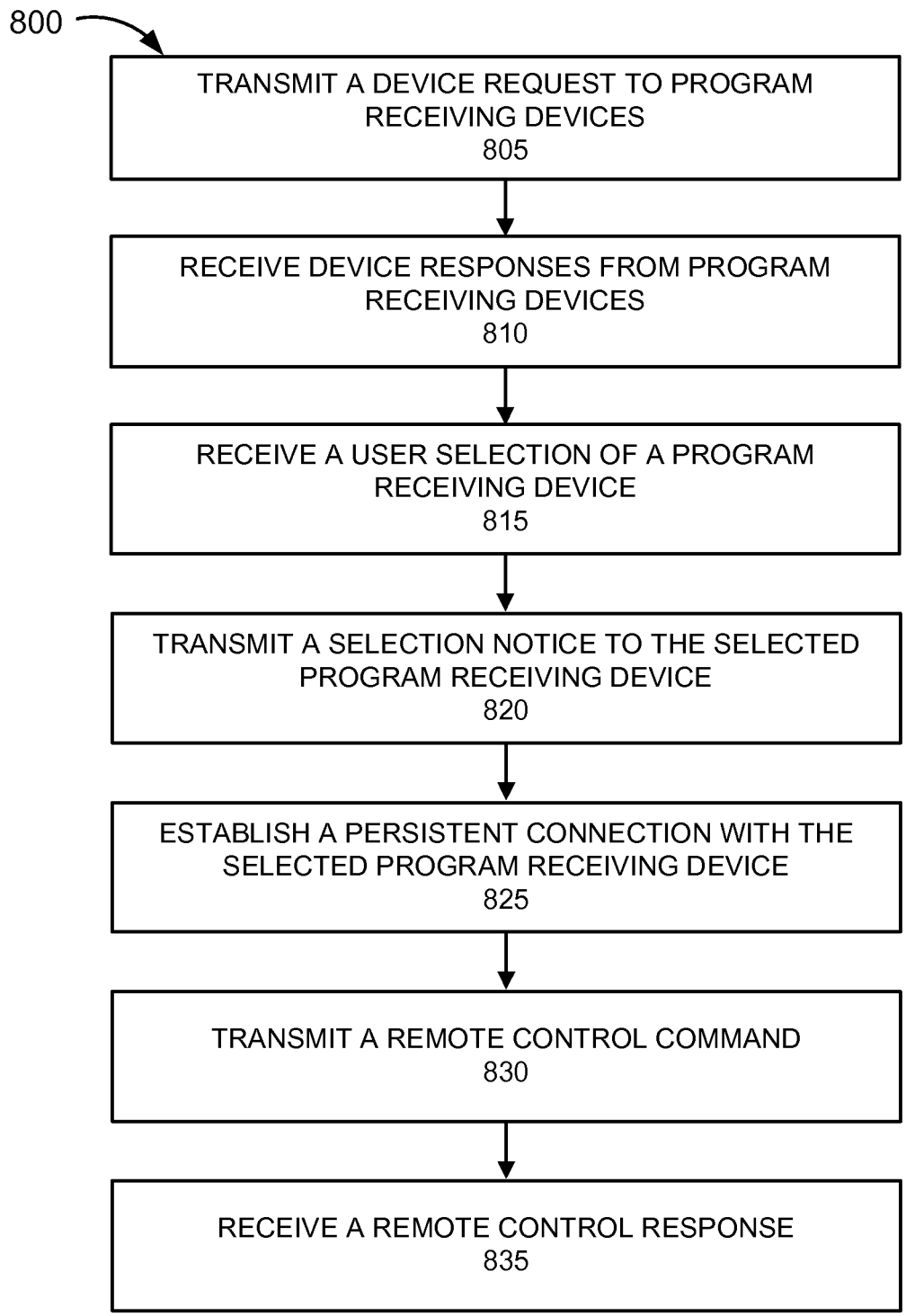
FIG. 8 is a flow diagram illustrating an exemplary process for remotely controlling a program receiving device without using a proxy service.

FIG. 8 is a flow diagram illustrating an exemplary process 800 for remotely controlling a program receiving device without using a proxy service. A step described in process 800 is performed by one of the devices illustrated in FIG. 6. For example, process 800 may be performed by mobile device 165 in which processor 405 may execute software 415 to perform the steps described.

Process 800 begins with receiving a request for a program (block 805). For example, mobile device 165 broadcasts a device request in user location 150. The device request invites active program receiving devices 175 to respond. For example, the device request is implemented as the device info request message 335.

In block 810, a device response that indicates an active program receiving device is received. For example, mobile device 165 receives a device response from one or multiple active program receiving devices 175. For example, the device response is implemented as the device info response message 335.

In block 815, a user selection of a program receiving device is received. For example, mobile device 165 provides a user interface indicating the available active program receiving devices 175 that responded to the device request. Mobile device 165 receives a user selection of a program receiving device 175 to remotely control.

In block 820, a selection notice is transmitted to the selected program receiving device. For example, in response to the user's selection, mobile device 165 generates and transmits a selection notice, which indicates that the user wishes to remotely control program receiving device 175, to the selected program receiving device 175. For example, as previously described, upon receipt of the selection notice, an agent of program receiving device 175 is activated for remote control processes.

In block 825, a persistent connection is established between mobile device 165 and the selected program receiving device. For example, mobile device 165 or program receiving device 175 establishes a persistent connection (e.g., a TCP/IP persistent connection). Additionally, logo display messages 320 are exchanged between mobile device 165 and program receiving device 175, as previously described.

In block 830, a remote control command is transmitted. For example, mobile device 165 receives a user selection of a remote control command (e.g., via a user interface, vocal command, etc.). In response, mobile device 165 generates and transmits a remote control command message to program receiving device 175. The remote control command is a notification message of the notification protocol described herein.

In block 835, a remote control response is received. For example, mobile device 165 receives a remote control response from program receiving device 175. The remote control response is a notification message of the notification protocol described herein. The remote control response may, for example, cause mobile device 165 to display, via a user interface, success, failure, error messages, etc. Process 800 may continue in which blocks 830 and 835 are repeated in accordance with the user's remote control request(s) are transmitted from mobile device 165, and remote control responses are received.

Although FIG. 8 illustrates an exemplary process 800 for remotely controlling a program receiving device without the proxy service, process 800 may include additional operations, fewer operations, and/or different operations than those illustrated in FIG. 8 and described herein.

Figure 9:
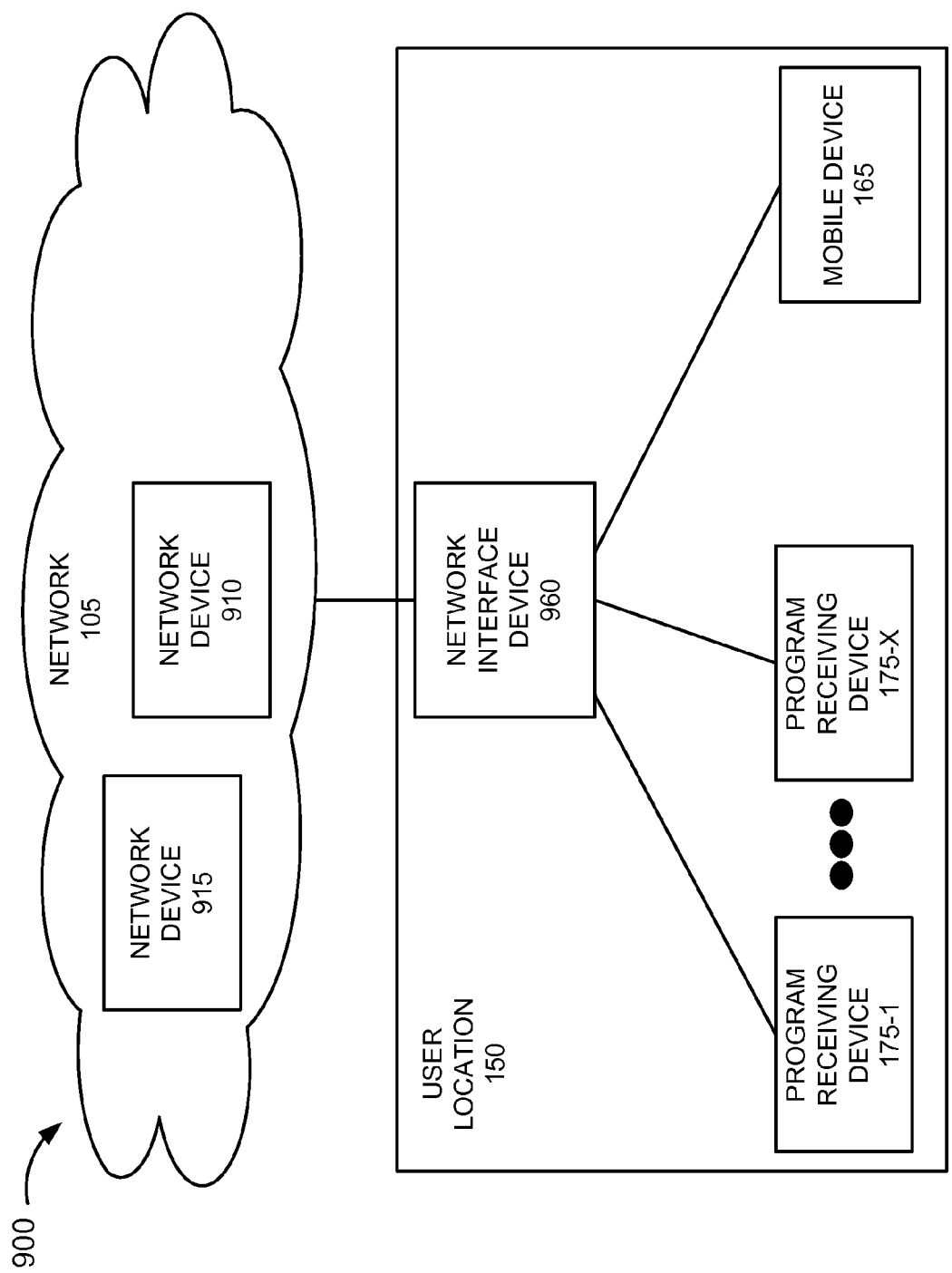
FIG. 9 is a diagram illustrating yet another exemplary environment in which an exemplary embodiment of remote control of a program receiving device may be implemented.

FIG. 9 is a diagram illustrating yet another exemplary environment in which an exemplary embodiment of remote control of a program receiving device may be implemented. As illustrated, an environment 900 includes network 105 that includes a network device 910. Environment 900 also includes user location 150 that includes mobile device 165 and program receiving devices 175. User location also includes network interface device 960. Mobile device 165 and program receiving device 175 have been previously described.

In contrast to environment 100 and environment 600, mobile device 165 may use a web service for invoking the remote control of program receiving device 175. Additionally, program receiving device 175 may use the web service to facilitate the remote control service.

The number of devices and networks, and the configuration in environment 900 are exemplary. According to other embodiments, environment 900 may include additional devices, different devices, and/or differently arranged devices, than those illustrated in FIG. 9. For example, environment 900 may include program network interface device 960. Additionally, or alternatively, environment 900 may include an additional network.

Environment 900 may be implemented to include wired and/or wireless connections among the devices and network illustrated. A connection may be direct or indirect and may involve intermediary device(s) and/or network(s) not illustrated in FIG. 9. Additionally, the number and the arrangement of connections between the devices and the network are exemplary.

Network device 910 includes a network device of an over-the-top (OTT) platform. For example, the OTT platform delivers video via the Internet directly to user devices. Network device 910 includes registration logic to allow mobile device 165 and program receiving device 175 to register their presence for remote control purposes. Network device 910 also includes logic to service requests for registration information. Network device 910 may be implemented as a server device. Network device 910 is described further below.

Network device 915 includes a network device that manages a remote control mode of mobile device 165. Network device 915 may be implemented as a server device. For example, the server device may be located in the program delivery network (e.g., a video home office server device, etc.). Network device 915 is described further below.

Network interface device 960 includes a device that interfaces with network 105, network devices 910 and 915, mobile device 165, and program receiving devices 175. Network interface device 960 may be implemented as a wireless router (e.g., a broadband router, etc.).

Figure 10:
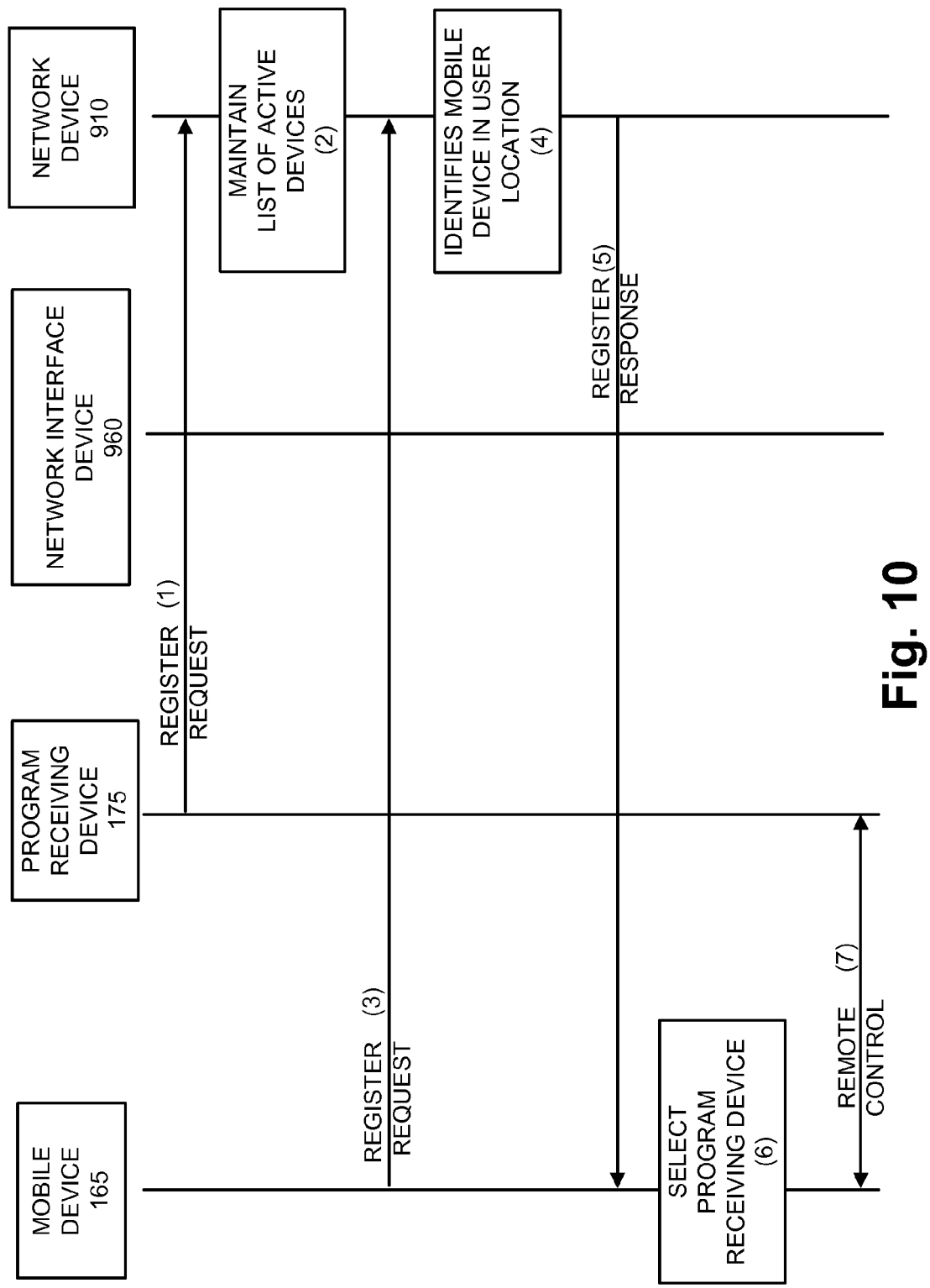
FIG. 10 is a messaging diagram illustrating an exemplary process pertaining to remote control of a program receiving device using a web service.

FIG. 10 is a messaging diagram illustrating an exemplary process performed by an exemplary embodiment of the program delivery system for remotely controlling program receiving devices using a web service. The exemplary process is described in relation to the devices illustrated in environment 900 of FIG. 9.

The messages and the data or information included therein are merely exemplary. According to other implementations, the program delivery system may use different types of messages and/or include different data or information. Additionally, or alternatively, although the exemplary process describes a particular device performing a step or an act of the process, the step or act may, alternatively be performed by another device, or some combination of devices.

Referring to FIG. 10, in step (1), program receiving device 175 is powered on and performs a pairing process to register itself with network device 910. For example, program receiving device 175 transmits a registration request that identifies program receiving device 175 (e.g., network address, name of device, etc.). The registration request may be implemented as an HTTP request.

In step (2), in response to the registration request, network device 910 stores the registration information. Based on a registration of each program receiving device 175, network device 910 has information indicating which program receiving devices 175 are active in user location 150.

In step (3), mobile device 165 executes a mobile application and performs a pairing process to register itself with network device 910. For example, mobile device 165 transmits a registration request that identifies mobile device 165. For example, the registration request includes a device identifier. The registration request may be implemented as an HTTP request.

In step (4), network device 910 identifies that mobile device 165 is located in user location 150.

In step (5), network device 910 transmits a registration response that indicates each of the active program receiving devices 175 in user location 150. The registration response may be implemented as an HTTP response.

In step (6), mobile device 165 receives the registration response and provides a user interface that indicates the active program receiving devices 175. The user of mobile device 165 selects the program receiving device 175 to control, and the messaging flow continues similar to that previously described in FIG. 7.

Figure 11:
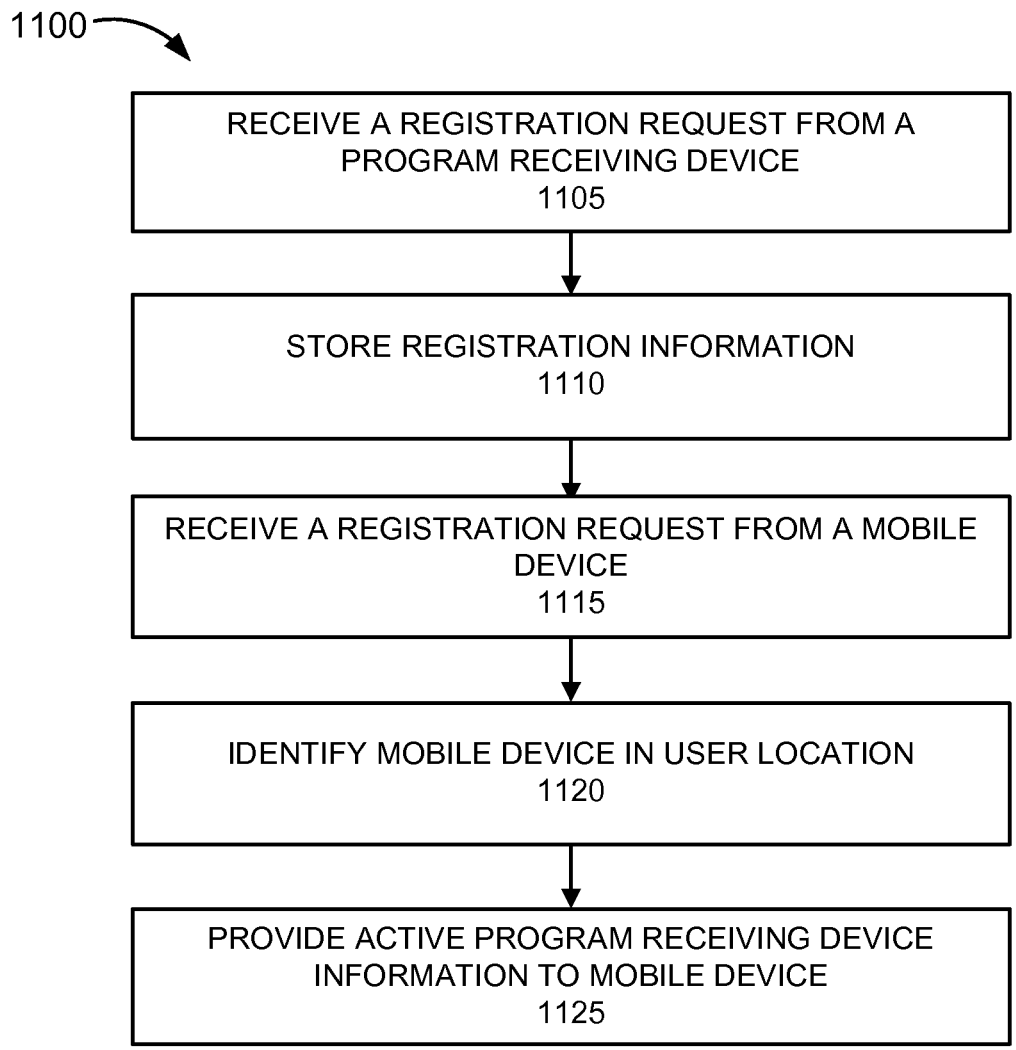
FIG. 11 is a flow diagram illustrating an exemplary process for remotely controlling a program receiving device using the web service.

FIG. 11 is a flow diagram illustrating yet another exemplary process 1100 for remotely controlling a program receiving device. A step described in process 1100 is performed by one of the devices illustrated in FIG. 9. For example, process 1100 maybe performed by network device 910 in which processor 405 executes software 415 to perform the steps described.

Process 1100 begins with receiving a registration request from a program receiving device. For example, during a boot-up process or a pairing process, program receiving device 175 generates and transmits a registration request to network device 910. The registration request includes device profile information, such as network address(es) (e.g., IP, MAC) and name of device (e.g., default name, user-assigned name). The registration request is received by network device 910.

In block 1110, the registration information is stored. For example, network device 910 stores the registration information. Network device 910 recognizes the presence of active program receiving devices 175 in user location 150 based on the registration information.

In block 1115, a registration request is received from a mobile device. For example, mobile device 165 executes a mobile application that allows the user to remotely control program receiving devices 175 in user location 150. Mobile device 165 generates and transmits a registration request to network device 910. The registration request may include a device identifier.

In block 1120, the mobile device is identified as being located in user location. For example, network device 910 identifies that mobile device 165 is located in user location 150 based on registration request being received (i.e., indicating that the user wishes to remotely control a program receiving device 175). Network device 910 may also use the network address (e.g., the IP address) of mobile device 165 as a basis to identify that mobile device 165 as being located in user location 150.

In block 1125, active program receiving device information is provided to the mobile device. For example, mobile device 165 may download the active program receiving information, which indicates each of the active program receiving devices 175 in user location 150, from network device 910. Alternatively, in response to identifying the location of mobile device 165, network device 910 pushes the active program receiving information to mobile device 165. Process 1100 may continue in a manner similar to that described in blocks 820 through 835 of process 800.

Although FIG. 11 illustrates an exemplary process 1100 for remotely controlling a program receiving device using a web service, process 1100 may include additional operations, fewer operations, and/or different operations than those illustrated in FIG. 11 and described herein.

Referring back to FIG. 9, according to an exemplary embodiment, as previously described, network device 915 manages which of the previous three approaches mobile device 165 uses to remotely control program receiving devices 175. That is, whether mobile device 165 remotely controls program receiving device 175 using approach 1 (i.e., the proxy service); approach 2 (i.e., not using the proxy service); or approach 3 (i.e., using the web service). According to an exemplary implementation, program receiving devices 175 perform a registration process or a pairing process with network device 915, in a manner similar to that previously described with respect to network device 910. In this way, network device 915 stores information indicating the active program receiving devices 175. Additionally, network device 915 stores information indicating the capabilities of active program receiving devices 175. For example, for program receiving devices 175 (e.g., a set top box) that may be issued to the user by the program service provider (e.g., a television service provider), remote control capability information pertaining to such program receiving devices 175 may be stored by network device 915. For other types of program receiving devices 175 (e.g., a smart television, an IP client device, etc.), remote control capability information may be obtained based on a user registration process pertaining to remote control services. Additionally, for example, the user may register mobile devices 165. In this way, network device 915 may store and manage information, as described herein, to allow network device 915 to select a remote control mode in which mobile device 165 operates.

Figure 12:
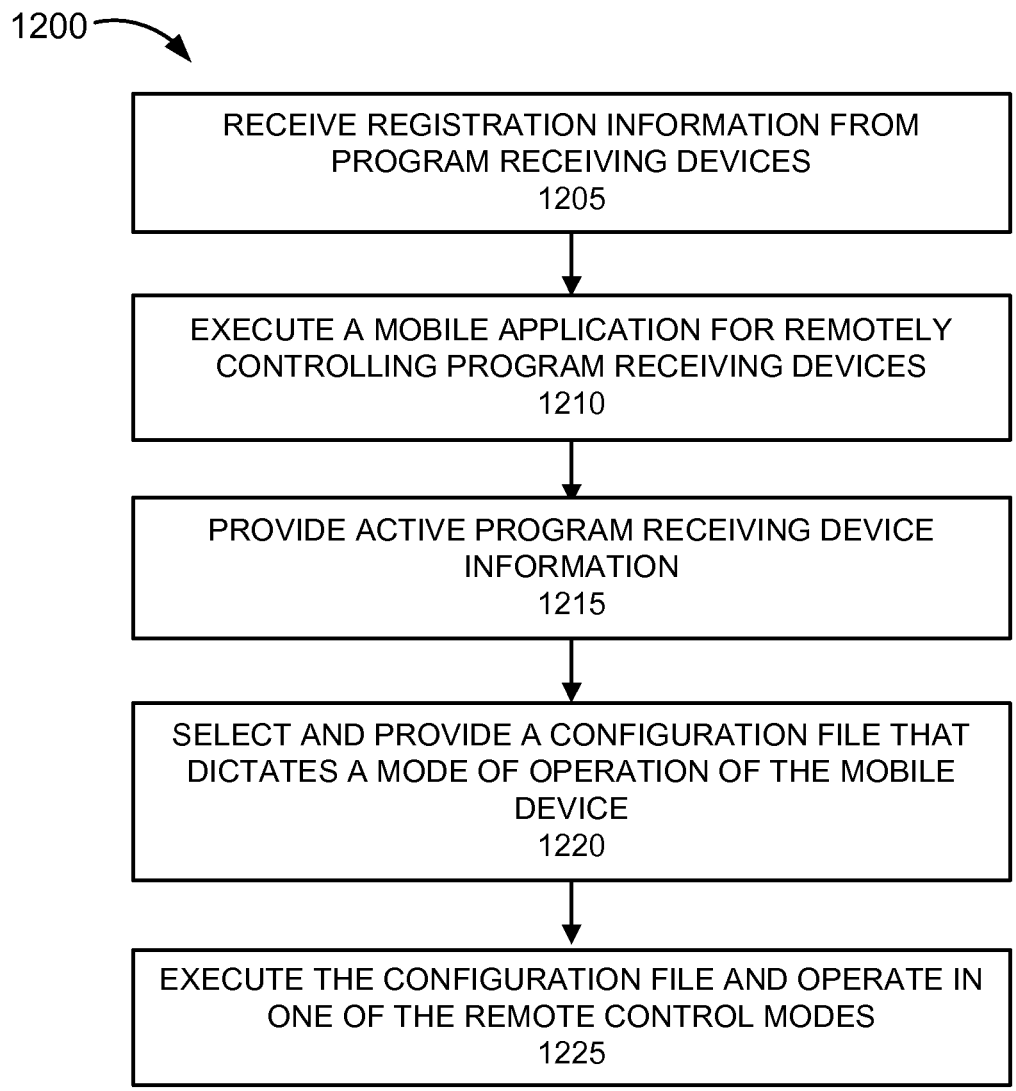
FIG. 12 is a flow diagram illustrating an exemplary process for selecting a remote control mode of operation for a mobile device.

FIG. 12 is a flow diagram illustrating an exemplary process 1200 for selecting a remote control mode. A step described in process 1200 is performed by one of the devices illustrated in FIG. 9. For example, process 1200 may be performed by mobile device 165 and network device 915 in which each processor 405 executes software 415 to perform a step described.

Process 1200 begins with receiving registration information from program receiving devices (block 1205). For example, program receiving devices 175 transmit registration requests to network device 915. The registration request includes device profile information.

In block 1210, a mobile application for remotely controlling a program receiving device is executed. For example, a mobile application for remotely controlling program receiving devices 175 is launched on mobile device 165. In response to the execution of the mobile application (e.g., during a startup process of the mobile application), mobile device 165 automatically establishes a connection to network device 915. Mobile device 165 transmits a message that indicates or gives notice to network device 915 that the mobile application for remotely controlling program receiving devices 175 has executed or is in the process of executing, starting, launching, etc.

In block 1215, active program receiving information is provided. Network device 915 correlates the one or more program receiving devices 175 that registered in block 1205, with mobile device 165 based on a device identifier or some other identifier (e.g., a service provider identifier, a user identifier, etc.) associated with mobile device 165. For example, network device 915 stores a database or a data structure that includes the device profile information of active program receiving devices 175 at user location 150 and correlates this with mobile device 165. Mobile device 165 or network device 915 pushes active program receiving device information to mobile device 165. The active program receiving device information includes information indicating each program receiving device 175 that is active and registered with network device 915.

In block 1220, a configuration file that dictates a mode of operation of the mobile device is selected and provided. For example, network device 915 selects one of the three modes of operation for remotely controlling program receiving devices 175 based on the remote control capabilities associated with the active program receiving devices 175. In this way, network device 915 correlates a mode of operation for mobile device 165 to one or more active program receiving devices 175. Thus, when user location 150 includes program receiving devices 175 having different capabilities, mobile device 165 operates in a suitable mode to remotely control an active program receiving device 175. Network device 915 may also store remote control history information relating to previous sessions and may use this information to select the appropriate configuration file. For example, the remote control history information may include previous mobile device 165 and program receiving device 175 mappings of modes.

In block 1225, the configuration file is executed and the mobile device operates in one of the remote control modes. For example, mobile device 165 executes the configuration file that indicates, among other things, one of the modes of operations. Process 1200 may continue by mobile device 165 remotely controlling program receiving device 175 according to one of the three approaches previously described.

Although FIG. 12 illustrates an exemplary process 1200 for selecting one of multiple remote control modes of operation for mobile device 165, process 1200 may include additional operations, fewer operations, and/or different operations than those illustrated in FIG. 12 and described herein. For example, according to an exemplary embodiment, process 1200 may omit block 1215. According to such an embodiment, mobile device 165 obtains active program receiving device information in accordance with one of the three approaches. Alternatively, for example, according to another embodiment of process 1200, a user's selection of an active program receiving device 175 may be provided to network device 915. In response, network device 915 provides a configuration file that is mapped to a mode for remotely controlling the selected program receiving device 175. According to another embodiment, network device 915 may obtain the location of the user (e.g., which room in the user's home the user is located). Network device 915 may correlate the room to the active device profile information. For example, the user may name a program receiving device 175 as the "living room set top box" or the "master bedroom set top box." According to such an example, network device 915 may correlate the user's location to a particular program receiving device 175. Network device 915 selects the configuration file that is mapped to this particular program receiving device 175 to allow the user to remotely control program receiving device 175 via mobile device 165.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5A, 5B, 8, 11 and 12, the order of the blocks may be modified according to other embodiments. Further, non-dependent blocks may be performed in parallel. Additionally, other processes described in this description may be modified and/or non-dependent operations may be performed in parallel. For example, according to the embodiments described in relation to process 1200, redundant steps may be omitted in relation to the three approaches for remotely controlling program receiving device 175. For example, process 1200 includes a step (at block 1215) in which mobile device 165 is provided active program receiving information. Assuming, network device 915 selects the proxy service (e.g., approach 1), mobile device 165 may omit requesting a list (e.g., step (3) of FIG. 2A) to avoid redundant steps. Similarly, other redundant steps may be omitted in view of the steps performed in process 1200 and the steps described in relation to each remote control approach. Additionally, other steps may be modified, such as, network device 915 providing the active program receiving device information to program network interface device 155 (e.g., in place of step (1) of FIG. 2A).

The embodiments described herein may be implemented in many different forms of software, firmware, and/or hardware. For example, a process or a function may be implemented as "logic" or as a "component." This logic or this component may include hardware (e.g., processor 405, etc.) and/or a combination of hardware and software (e.g., software 415). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 410.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method comprising:
   receiving, by a network device, registration information from one or more program receiving devices located at a customer's premises that are capable of providing programs to a user and capable of being remotely controlled by the user;
   receiving from a user device, by the network device, a message indicating that the user device executed software that allows the user to remotely control a program receiving device;
   transmitting to the user device, in response to the message and by the network device, active program receiving device information that indicates the one or more program receiving devices;
   selecting, by the network device, a configuration file from multiple configuration files based on device profile information pertaining to the one or more program receiving devices, wherein the multiple configuration files can cause the user device to operate in different modes including a proxy service mode, a direct communication mode, and an over-the-top mode, and wherein the configuration file is an executable file that causes the user device to operate in one of the different modes for remotely controlling at least one of the one or more program receiving devices; and
   transmitting to the user device, by the network device, the configuration file.

2. The method of claim 1, further comprising:
   executing, by the user device, the configuration file; and
   operating, by the user device, in the one of the different modes for remotely controlling the at least one of the one or more program receiving devices.

3. The method of claim 2, further comprising:
   providing a proxy service to allow the user device to remotely control the at least one of the one or more program receiving devices.

4. The method of claim 3, wherein the providing comprises:
   receiving from the user device, by a proxy device, a remote control command;
   generating, by the proxy device, a notification command based on the remote control command;

transmitting the notification command, by the proxy device, to one of the one or more program receiving devices;

receiving, by the proxy device, a notification response from the one of the one or more program receiving devices;

generating, by the proxy device, a remote control response based on the notification response; and transmitting the remote control response, by the proxy device, to the user device.

5. The method of claim 4, further comprising:

receiving from the user device, by the proxy device, a user selection that indicates a user's choice to remotely control the one of the one or more program receiving devices; and establishing a persistent connection between the proxy device and the one of the one or more program receiving devices.

6. The method of claim 2, further comprising:

providing a web service associated with an over-the-top platform to allow the user device to remotely control the at least one of the one or more program receiving devices.

7. The method of claim 6, wherein the providing comprises:

storing, by a server device of the over-the-top platform, the registration information; and identifying that the user device is located at the customer's premises.

8. The method of claim 2, further comprising:

establishing, by the user device, a persistent connection with one of the one or more program receiving devices;

receiving, via a user interface of the user device, a user selection of a remote control command;

generating, by the user device, a remote control command message in response to the user selection; and transmitting, by the user device, the remote control command message to one of the one or more program receiving devices.

9. A program delivery system comprising:

a program delivery device comprising:
  a first communication interface;
  a first memory to store first instructions; and
  a first processor to execute the first instructions to:
    receive, via the first communication interface, registration information from one or more program receiving devices located at a customer's premises that are capable of providing programs to a user and capable of being remotely controlled by the user;
    receive from a user device, via the first communication interface, a message indicating that the user device executed software that allows the user device to remotely control a program receiving device;
    transmit to the user device, in response to the message, via the first communication interface, active program receiving device information that indicates the one or more program receiving devices registered with the program delivery device;
    select, based on device profile information, a configuration file from multiple configuration files based on device profile information pertaining to the one or more program receiving devices, wherein the multiple configuration files can cause the user device to operate in different modes including a proxy service mode, a direct communication mode, and an over-the-top mode, and wherein the configuration file is an executable file that causes the user device to operate in one of the different modes for remotely controlling at least one of the one or more program receiving devices; and
    transmit to the user device, via the first communication interface, the configuration file.

10. The program delivery system of claim 9, wherein the one of the different modes provides that the user device communicates with a proxy service provided by a media server located at the customer's premises, the program delivery system further comprising:

the media server comprising:
  a second communication interface;
  a second memory to store second instructions; and
  a second processor to execute the second instructions to:
    receive, via the second communication interface, a remote control command from the user device;
    generate a notification command based on the remote control command;
    transmit the notification command, via the second communication interface, to one of the one or more program receiving devices;
    receive, via the second communication interface, a notification response from the one of the one or more program receiving devices;
    generate a remote control response based on the notification response; and
    transmit, via the second communication interface, the remote control response to the user device.

11. The program delivery system of claim 10, wherein the remote control command is of a binary protocol and the notification command is of a notification protocol.

12. The program delivery system of claim 11, wherein the notification protocol includes a notification message that includes location information pertaining to a picture stored on or accessible to the user device, and causes the one of the one or more program receiving devices to display the picture.

13. The program delivery system of claim 11, wherein each notification message of the notification protocol includes a session identifier and a command identifier, and wherein the notification protocol includes notification messages to change a channel, change a volume, cursor, perform an enter operation, access a guide, and access a menu.

14. The program delivery system of claim 10, wherein the second processor to execute the second instructions to:

receive a user selection indicating that one of the one or more program receiving devices is to be remotely controlled;

establish, via the second communication interface, a persistent connection with the user device; and transmit, via the second communication interface, a wakeup message to the one of the one or more program receiving devices.

15. The program delivery system of claim 9, wherein the one of the different modes provides that the user device communicates with a web service that allows the user device to remotely control one of the one or more program receiving devices, and another one of the different modes allows the user device to remotely control one of the one or more program receiving devices without using a proxy service.

16. The program delivery system of claim 9, wherein, when selecting the configuration file, the first processor to execute the first instructions to:

store configuration files pertaining to the different modes of operation;

identify whether a correlation exists between one of the multiple configuration files and the device profile information, wherein the device profile information indicates remote control capabilities associated with the one or more program receiving devices; and select the configuration file that correlates with the device profile information.

17. A non-transitory storage medium storing instructions executable by a computational device, wherein the instructions comprise instructions to:

receive registration information from one or more program receiving devices located at a customer's premises that are capable of providing programs to a user and capable of being remotely controlled by the user;

store the registration information;

receive a message indicating that a user device started software for remotely controlling program receiving devices;

transmit to the user device, in response to the message, active program receiving device information that indicates the one or more program receiving devices that are registered;

select, based on device profile information that indicates remote control capabilities associated with the one or more program receiving devices, a configuration file from multiple configuration files, wherein the multiple configuration files can cause the user device to operate in different modes including a proxy service mode, a direct communication mode, and an over-the-top mode, wherein the configuration file is an executable file that causes the user device to operate in one of the different modes for remotely controlling at least one of the one or more program receiving devices; and transmit the configuration file to the user device.

18. The non-transitory storage medium of claim 17, wherein the instructions comprise further instructions to:

store configuration files pertaining to the different modes of operation of the user device;

identify whether a correlation exists between one of the multiple configuration files and the device profile information; and select the configuration file that correlates with the device profile information.

19. The non-transitory storage medium of claim 17, wherein the instructions comprise further instructions to:

receive a user selection that indicates one of the one or more program receiving devices to be remotely controlled; and wherein the instructions to select include instructions to:

select the configuration file based on the user selection.

20. The non-transitory storage medium of claim 17, wherein the instructions comprise further instructions to:

store previous remote control session information, and wherein the instructions to select include instructions to:

select the configuration file based on the previous remote control session information.

* * * * *